US008709222B2

(12) United States Patent
Gilmore et al.

(10) Patent No.: US 8,709,222 B2
(45) Date of Patent: Apr. 29, 2014

(54) METHOD AND APPARATUS FOR PRODUCING HIGH VOLUMES OF CLEAN WATER BY ELECTRO COAGULATION

(75) Inventors: F. William Gilmore, Aurora, CO (US); Russell Richard Renk, Sequim, WA (US)

(73) Assignee: Latitutde Clean Tech Group, Inc., Boca Raton, FL (US)

( * ) Notice: Subject to any disclaimer, the term of this patent is extended or adjusted under 35 U.S.C. 154(b) by 162 days.

(21) Appl. No.: 13/162,413

(22) Filed: Jun. 16, 2011

(65) Prior Publication Data

US 2011/0308938 A1    Dec. 22, 2011

Related U.S. Application Data

(60) Provisional application No. 61/356,027, filed on Jun. 17, 2010.

(51) Int. Cl.
*C02F 1/463* (2006.01)
(52) U.S. Cl.
CPC ..................................... *C02F 1/463* (2013.01)
USPC ..................... 204/278.5; 204/229.6; 204/663; 204/556; 205/744; 210/702; 210/748.17
(58) Field of Classification Search
USPC ....................... 204/278.5, 289, 268
See application file for complete search history.

(56) References Cited

U.S. PATENT DOCUMENTS

| 820,113 | A | * | 5/1906 | Hinkson | 204/268 |
|---|---|---|---|---|---|
| 4,036,726 | A | * | 7/1977 | Gale et al. | 204/229.6 |
| 5,815,388 | A | * | 9/1998 | Manley et al. | 363/63 |
| 6,238,546 | B1 | * | 5/2001 | Knieper et al. | 205/742 |
| 6,689,271 | B2 | * | 2/2004 | Morkovsky et al. | 205/757 |
| 6,866,757 | B2 | * | 3/2005 | Gilmore | 204/269 |
| 2006/0096853 | A1 | * | 5/2006 | King | 204/230.2 |
| 2008/0223731 | A1 | * | 9/2008 | Lee | 205/761 |

FOREIGN PATENT DOCUMENTS

DE         19835759 A1 *   2/2000

* cited by examiner

*Primary Examiner* — Harry D Wilkins, III
(74) *Attorney, Agent, or Firm* — Kyle W. Rost

(57) ABSTRACT

In an electrolytic apparatus for removing contaminants from water, a set (110) of spaced apart conductive electrodes (40) in a reaction chamber (54, 112, 114), is arranged in oppositely charged groups of first and second interleaved electrodes with flow paths between them. Non-conductive turbulence inducers (158, 168) on the faces of electrodes (40) are applied to water in the flow paths. One variety is modular elements (158) with stepped increases in width to present a narrow leading edge in the direction of flow. Another variety is a continuous set of wave guides (168) bordering the flow path. Electrodes (40) are selectively powered in patterns creating turbulence, with effective patterns including a first and last electrode powering pattern and a mini-cell electrode powering pattern.

30 Claims, 14 Drawing Sheets

METHOD AND APPARATUS FOR PRODUCING HIGH VOLUMES OF CLEAN WATER BY ELECTRO COAGULATION

CROSS-REFERENCE TO RELATED APPLICATION

This application claims the benefit of U.S. Provisional Patent Application Ser. No. 61/356,027 filed Jun. 17, 2010, copending.

BACKGROUND OF INVENTION

1. Field of the Invention

The invention generally relates elements used in electrical and wave energy chemistry. More specifically, the invention relates to electrolytic apparatus composed of electrodes with an electrode supporting means consisting of a dielectric gasket or spacer. In a further aspect, the invention relates to an electrolytic apparatus and method that employ parallel plate electrodes to form plural separate treatment chambers or zones, with a feeding or withdrawing means providing a flow of liquid to be treated to the cells. The invention discloses apparatus and method for water purification and with the ability to control and monitor variables needed to achieve optimal water purification results using minimal power consumption.

2. Description of Related Art Including Information Disclosed Under 37 CFR 1.97 and 1.98

Electro coagulation is the process of introducing electricity to a process fluid such as water to induce a chemical reaction. It is well known that a process fluid can be purified using DC electricity where the voltage is the pressure or electromotive force causing the electrons to travel, and current or amperes are the rate of flow or number of electrons. Using a bank of electrode plates that are parallel, high current is displaced across these plates where voltage is not as important as amperage.

Published United States Patent Application 2003-0070919 to Gilmore shows a non-fouling flow path in an electrode cell using the peripheral-to-center flow pattern. This pattern is especially desirable because it utilizes efficient, symmetrical electrode plates. Further, alternating flow between a center aperture in one plate and several peripheral apertures in another can produce improved turbulence.

It would be desirable to increase the degree of turbulence in a process fluid to further reduce fouling. This result would better enable the reaction chamber to be operated with sustained process efficiency over a predictable interval. Ideally, the reaction parameters of the chamber should determine the consumption of the electrodes. As chamber design improves, maintenance or replacement operations can be performed at calculated, scheduled intervals, allowing a high degree of confidence that the electro coagulation process will remain effective and efficient between such services.

Further, it would be desirable to construct an electro coagulation chamber in such a way that assembly and disassembly can be conducted under optimal circumstances; and further, operation of the chamber can be conducted under optimal circumstances. These two interests compete. It would be desirable for a single chamber to accommodate both interests.

To achieve the foregoing and other objects and in accordance with the purpose of the present invention, as embodied and broadly described herein, the electro coagulation chamber and method of this invention may comprise the following.

BRIEF SUMMARY OF THE INVENTION

The invention is an electrolytic apparatus and a method using electro coagulation for removing contaminants and otherwise purifying water. In operation, the invention monitors and controls variables in the electro coagulation system to achieve optimal water purification while consuming minimal power.

In addition to providing highly efficient and effective operation, the design of the system employs technologies that allow an increase the time between scheduled maintenance events. Electro coagulation is similar to any electrolysis process where the positive electrode or anode loses material and the negative electrode or cathode attracts deposits. The buildup of deposits on metal cathode plates increases generated heat, while the breakdown of the positively charged anode leads to maintenance costs and down time for the entire system, which increases the cost of operation. The system provides an ability to change the polarity on these positive and negative plates, which extends the life of the plates and results in reduced maintenance. Polarity reversal can be tied to the conductivity of water passing thru the reaction chamber. A closed loop system can intertwine power induced into the reaction with conductivity and sediment buildup on the electrodes.

The method and apparatus of the invention destabilizes suspended particles in the process stream by positively charging ions for reaction with negatively charged particles. Passing these charged particles over a multitude of electrode plates produces a highly stable flock of contaminates. The process removes heavy metals and oxides as well as suspended and colloidal solids. It breaks oil emulsions in water and removes fats, oil, and grease. It removes complex organics. It destroys and removes bacteria, viruses and cysts. It processes multiple contaminates. It reduces or eliminates chemical additives. By a novel understanding and corresponding adjustment of system variables, the method of operation tunes the apparatus to operate with reduced maintenance on the electrodes while performing electro coagulation using a relatively small amount of power.

The disclosed method and apparatus operate to quickly accommodate large volumes of water. As an example of system speed, water may be processed during a fifteen second residence time within a reaction chamber, which is sufficient to neutralize a suspension in the water. Approximately eighteen seconds after the processing is completed, deposits in the water rise to the top of a holding container for removal.

Much has been written about the electro coagulation process, yet this design has improved on the ability to process more water using a lower amount of power to run the system. Several features in the design provide a higher throughput. First, features added to create turbulence in the reaction chamber enhance the process of polarizing the sediment or suspension. Electrode surfaces are smooth and tend to not emulsify the passing materials. Adding turbulence or breaking up the flow of water molecules and charged particulates stimulates a mixing event that brings molecules closer to the electrodes. When turbulence is added, water mixes more completely.

Second, electrons that pass through the electrodes tend to migrate to sharp edges. The electrodes of this invention are coated on their edges with a non-conductive material, which forces the electrons toward the passing water moving through the reaction chamber. The efficiency of this design provides a more uniform electrolysis process, resulting in lower overall power consumption.

The basic electro coagulation system takes alternating (AC) current and converts it into direct (DC) current. A flow of water passes between parallel electrode plates of an electrode set. Multiple electrode sets are used to provide optimal performance. Every other plate in a set is connected to a positive or negative conductive bus bar. The conductivity of contaminated water tends to vary according to what elements saturate the water being processed. Measuring conductivity provides the ability to make on-the-fly responses to varying power levels that are needed to create the reaction according to the content of the process water.

Key technologies needed to create the reaction are electronics, chemistry, mechanical & fluid dynamics, electrolytic conductivity, logic, user interface, and safety. More specifically, this system passes dirty water over metal plates that conduct electricity and tunes itself to the conditions by making the water more conductive in a localized area. A flocking event can be started when a remote pump is turned on and off to inject conductive particulates into the water at a given interval.

According to the invention, an electrolytic apparatus for removing contaminants from influent water is formed of a reaction chamber having a water inlet and water outlet. The reaction chamber houses a set of spaced apart conductive electrodes arranged in first and second groups of electrodes with electrodes of the first group interleaved in alternating sequence with electrodes of the second group. The interleaved electrodes define a flow path in a flow direction defined between an electrode of the first group and a juxtaposed electrode of the second group. The flow path extends within the reaction chamber from water inlet toward water outlet. A polarizing device oppositely polarizes electrodes in the first and second groups. Turbulence inducers extend transversely to a face of an electrode and into the flow path. The turbulence inducers are selected from a group consisting of a plurality of modular, nonconductive elements attached to a face of a host electrode in a position presenting a narrow leading edge toward the direction of flow, with stepped increases in width toward a trailing edge of such turbulence inducers, and a plurality of elongated, nonconductive, spaced apart curve-defining elements positioned longitudinally to the direction of flow, and combinations of both.

According to another aspect of the invention, an electrolytic apparatus for removing contaminants from influent water if formed of a reaction chamber having a water inlet and a water outlet. A set of spaced apart conductive electrodes in the reaction chamber is arranged into first and second groups of electrodes, each group containing a plurality of electrodes, with electrodes of the first group interleaved in alternating sequence with electrodes of the second group, defining a flow path in a flow direction between an electrode of the first group and a juxtaposed electrode of the second group. The flow path extends within the reaction chamber from the water inlet towards the water outlet. A polarizing device initially, oppositely polarizes at least some of the electrodes in each of the first and second groups of the set (110). The first and second groups of electrodes are interleaved such that an electrode of the first group is the first electrode of the set and an electrode of the second group is the last electrode of the set. The polarizing device is connected to apply a first polarity to the first electrode and to apply a second and opposite polarity to the last electrode (150). The polarizing device is electrically disconnected from remaining electrodes of the first and second groups.

According to still another aspect of the invention, an electrolytic apparatus for removing contaminants from influent water is formed of a reaction chamber having a water inlet and a water outlet. A set of spaced apart conductive electrodes in the reaction chamber is arranged in first and second groups of electrodes, each group containing a plurality of electrodes, with electrodes of the first group interleaved in alternating sequence with electrodes of the second group, defining a flow path in a flow direction between an electrode of the first group and a juxtaposed electrode of the second group. The flow path extends within the reaction chamber from the water let towards the water outlet. A polarizing device initially, oppositely polarizes at least some of the electrodes in each of the first and second groups of the set. The polarizing device further is selectively actuatable to reverse polarity of the initially polarized electrodes in each of the first and second groups of the set (110). A device for capacitively discharging the initial polarization of the initially polarized electrodes is responsive to selective actuation of the polarity reversing function to capacitively discharge the electrodes.

The invention provides that aluminum, iron, polymers, and other material that enhance the electro coagulation process are injected into the influent stream in advance of the reaction chamber. These injected materials can be used with sacrificing and non-sacrificing electrode plates to reduce or eliminate the need to replace plates and can also eliminate or reduce scale.

The invention further provides that the electrode plates can be rounded on the corners and beveled on the edges to increase the reaction on the plates and eliminate surface charges which can concentrate at sharp points.

In addition, the invention provides that the electrode plates are contained in cells or sets formed of alternating positive (anode) plates and negative (cathode) plates. Within a first cell or first set of plates, alternating plates are oppositely charged so that anodes and cathodes face one another and each flow path for effluent through a single cell or set must pass between an anode and a cathode. A second cell or set of plates follows the first set, and the flow path for effluent now extends between electrode plates of the second set. However, the order of the alternating anodes and cathodes is reversed in the second set. Thus, if the flow path in the first set is viewed as having an anode on the right, the flow path in the second set has the anode on the left. Likewise, the position of the cathode is switched from first set to second set along a single flow path. This reversal of field at successive serial lengths of the flow path increased turbulence and reactivity.

The accompanying drawings, which are incorporated in and form a part of the specification, illustrate preferred embodiments of the present invention, and together with the description, serve to explain the principles of the invention. In the drawings:

DETAILED DESCRIPTION OF THE PREFERRED EMBODIMENT

The following detailed description of the invention is merely exemplary in nature and is not intended to limit the invention or the application and uses of the invention. Furthermore, there is no intention to be bound by any theory residing in the preceding background of the invention or the flowing detailed description of the invention.

Figure 1:
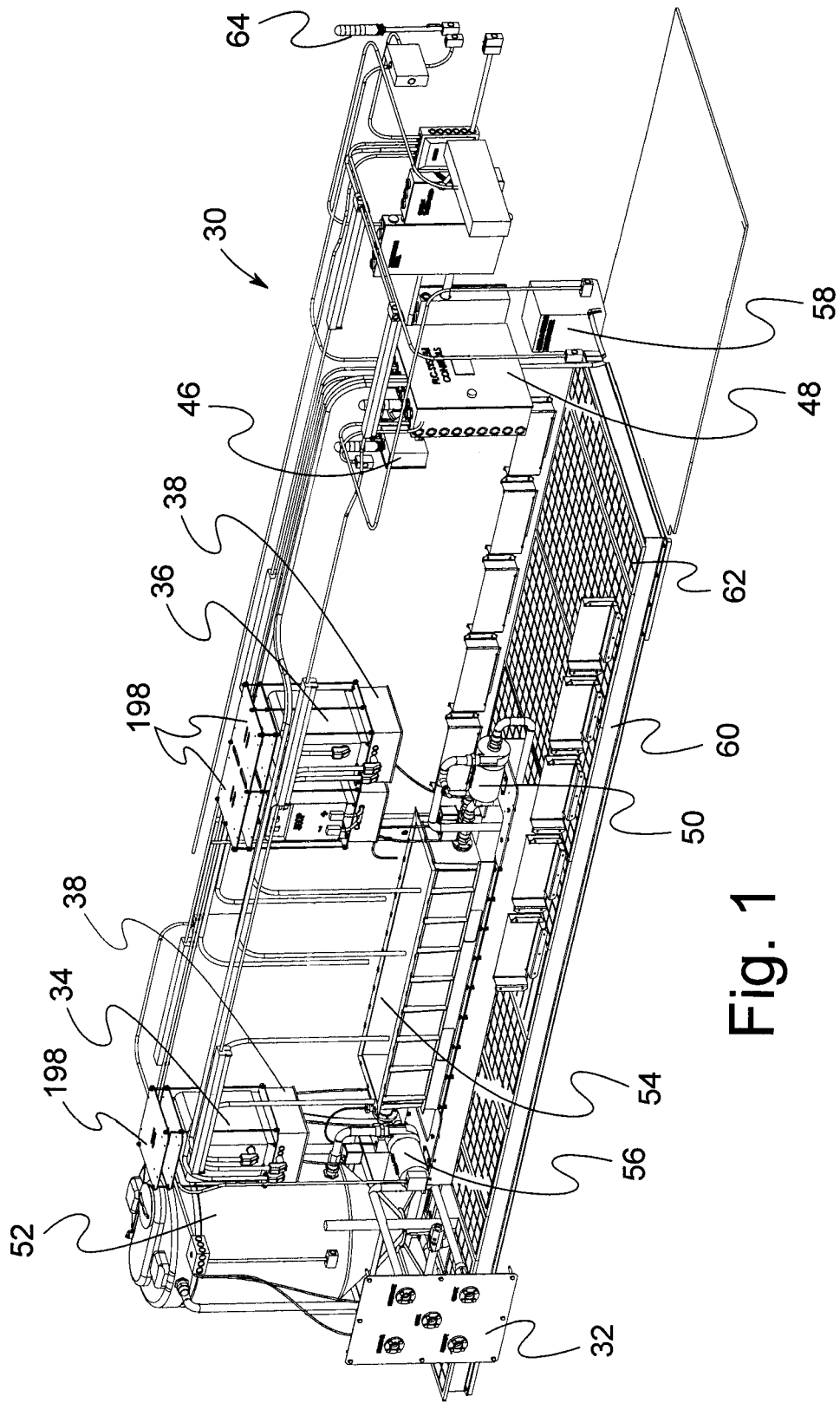
FIG. 1 is an isometric view of the electro coagulation system, showing major components.

With reference to the drawings, the electro coagulation (EC) system 30, also known as an electro precipitation (EP) system, is suited to treat a stream of fluid influent such as water, which will be referred to as process water, process fluid, or influent. FIG. 1 illustrates the EC system 30 and its major components. Process water is brought into the system through an inlet at main interface system or main disconnect 32, where various streams coming into the system and leaving the system can be managed. The disconnect plate provides a common connection point for incoming clean water needed to flush out the system during scheduled maintenance intervals. It also provides an outlet for treated water and a common location to remove any sediment that is a byproduct of the electro coagulation process from a surge tank and reaction chamber.

In greater detail, this interface system 32 can be configured for different operating environments, according to need and availability of resources. The illustrated main disconnect 32 provides five interfaces for different streams. One interface is for incoming water or other process fluid, which may be a stream of contaminated water to be treated. A second interface is an outlet for outgoing process fluid, which may be a stream of process water that has been cleaned by the electro coagulation system. A third interface is for incoming utility water, such as from a municipal water supply. The clean water will be variously used, such as for flushing the system, as mentioned above. A fourth interface is for outgoing utility water, which may be a stream of municipal water that is sent to a sewer. A fifth interface is a stream of solids that has been removed from the process fluid, such as from the surge tank and reaction chamber, as mentioned above. This stream is sent for disposal or further processing.

One or more power supplies with polarity switching devices serve the electro coagulation system. The illustrated system employs multiple power supplies wherein each power supply serves a single set of electrode plates. Both a single DC power supply 34 and a multiple or dual DC power supply 36 are suitable. Each receives AC power and rectifies it into DC power, which is needed to perform the electrolysis process in the reaction chamber. The power supplies feed DC current to electrodes in the reaction chamber.

A polarity reversing device 38 is associated with the output of each power supply. The polarity reversal device 38 can be operated from time-to-time to reverse the polarity of the DC electricity going to the electrodes. Reversing polarity increases turbulence in the process liquid because ion and charged particles that previously were migrating toward one side of the flow path must reverse direction and migrate toward the opposite side of the flow path. In addition, the electrode being operated as the anode commonly tends to build-up sediment. Reversing polarity can extend the life of the electrodes by causing the electrodes to shed any sediment build-up on the electrode that has been operating as the anode.

It has been observed that when polarity is reversed, there can be an unexpected interruption in efficiency within a reaction chamber. This interruption has been observed to last for a short but observable period of time, such as one or two minutes, during which time the reactions in the reaction chamber are below full capacity. Such a delay in reaching full efficiency associated with reversing polarity of the plates is undesirable. The reverse migration of charged ions and particles is slowed, thus delaying the desired increase in turbulence. In addition, the delay could lead to discharging unprocessed or under processed water, especially if polarity is reversed frequently. The seriousness of the problem is still more evident if the desired period for reversing polarity is similar to the recovery period, such as one or two minutes, which could lead to processing efficiency that is almost always below capacity.

Figure 14:
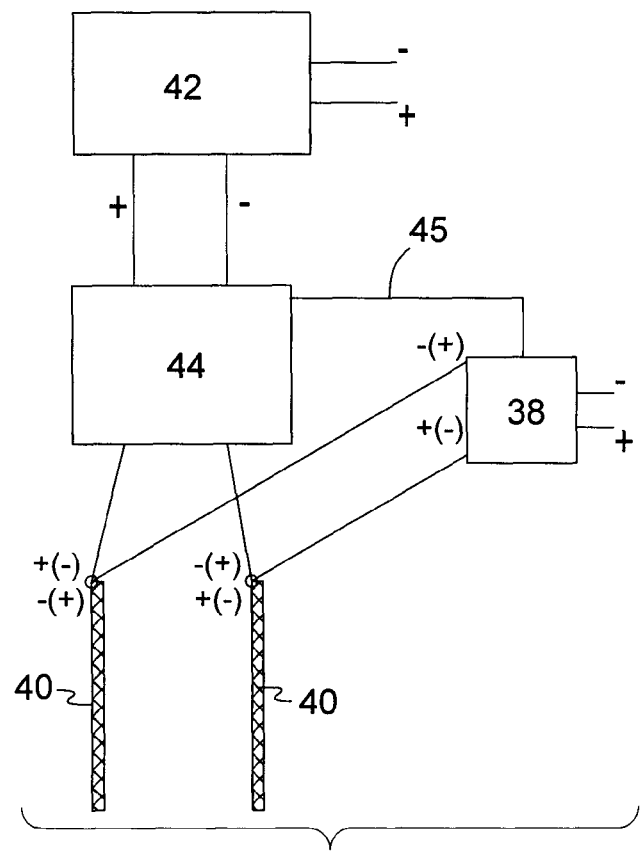
FIG. 14 is a schematic diagram showing a polarity discharge system applied to electrode plates.

It has been discovered that this delay associated with polarity reversal can be decreased to near instant return to full efficiency. FIG. 14 shows a schematic arrangement for substantially eliminating the delay. A representative pair of coupled electrodes 40 is instantaneously oppositely charged such that at one instant, a first one of the electrodes may be regarded as the anode and the second may be regarded as the cathode. These electrodes are polarized according to the position of a pole-reversing switch 38. Power supply 34, 36 provides a direct current feed to switch 38. Depending upon the position of switch 38, the direct current feed is supplied to electrodes 40 with the polarity mentioned above, or switch 38 is reversed to reverse polarity. Thus, at a subsequent instant, the first electrode becomes the cathode and the second becomes the anode. To quicken recovery of reaction rate between the electrodes, a capacitor 42 can be selectively connected across the electrode pair through switching relays 44 to achieve direct current discharge whenever switch 38 reverses plate polarity. At the moment of each polarity reversal, switching relays 44 connect capacitor 42 between the opposite polar electrodes 40 with appropriate orientation to discharge the prior polarity of the electrodes. A data line 45 may be used to synchronize the operation of switch 38 with relays 44, or the relays 44 may be associated with suitable sensors to directly detect reversals of plate polarity. As a result, the electrodes quickly resume efficient functioning after a polarity reversal.

In EC system 30, human interfaces allow control over system variables. Touch screens 46 and 48 allow human input to control process variables and to monitor all variables. For example, a screen view can show the operator the volts and amps sensed at each power supply and can allow the operator to change the amperage at a power supply. A screen view can show total system power expressed in KVA, flow through the reaction chamber expressed in GPM, reaction chamber pressure and temperature, and conductivity of the process fluid. A screen view can show polarity reversal time in seconds and either enable or disable polarity reversal. Where a separate seeding pump is used, a screen view can show whether the seeding pump is enabled when the process is started and allow the seeding pump to be enabled or disabled. Where seeding employs an optional take-off from discharge pump 50 to the surge tank, the screen view can allow the take-off to be enabled or disabled, such as by opening or closing a take-off valve. Screen views allow monitoring valve status and controlling valves and pump speeds to establish desirable fluid flow or to flush the system. A software system monitors system operation, reports on the status of fluid processing operations, and receives commands at the touch screens.

Process water from the main interface system is directed to a surge tank 52. This tank 52 has a fluid level sensor that measures the incoming volume of water. A proportional valve is tied to this sensor and is used to throttle the incoming volume. The surge tank is conical at its base so that it will trap larger impurities and particles that otherwise might clog flow through the reaction chamber. The conical trap is drained during scheduled maintenance events and accumulated solids are discharged. The outgoing side of the tank uses a variable pump to pull the water out of surge tank 52 at a known rate.

The reaction chamber 54 is a tank that receives process fluid from surge tank 52. In the view of FIG. 1, reaction chamber 54 is shown in simplified form as an empty vat. Additional views show that reaction chamber 54 is provided with electrodes, covers, and other supporting equipment when ready for operation. Inlet pump 56 and outlet pump 50 control the level of process fluid in the reaction chamber. These pumps 50, 56 are variable speed, as controlled by operating software using closed loop logic that measures fluid level in the reaction chamber and sets the pump speeds as desired to achieve optimal processing results. The inlet pump 56 is associated with variable pump valves, flow meters, conductivity sensors, and a catalyst injector, which enable the process fluid to be conditioned prior to entering the reaction chamber 54. The outlet pump 50 is plumbed to an optional return line to the surge tank 52, allowing selective return of a part of the processed effluent from the reaction tank to the surge tank, where the returned effluent serves to seed the unprocessed effluent in the surge tank.

Electrical power into the system often will be at a high voltage, such as 440-480VAC at 200 amps, 3 phase. A transformer 58 receives the incoming current and reduces it to lower voltages, such as 230VAC and 110VAC. The use of transformer 58 provides a scalable method of driving lower powered devices.

A certain amount of wetness or spillage is a likely byproduct of processing large quantities of water or even may be the byproduct of ambient humidity. For safety and convenience, it is desirable to remove water from the floor areas where the operator must travel. The electro coagulation system is mounted atop a base framework 60 that also carries a superstructure configured as a flat structural surface with sufficient drainage to quickly remove water. The area near the reaction chamber 54 as well as other areas where process water travels is provided with raised floor 62 formed of drainage grid panels. The incoming and outgoing water lines are also contained in or below this raised flooring 62, which is capable of draining and removing water in the event of a spill. This floor 62 is coated with non-conductive material to prevent any electrical leakage throughout the system. Thus, the floor 62 has the double purpose of protecting the operator from electrical leakage and keeping the operator out of any water that may fall on the floor 62.

A signal light 64 operates under software control to indicate the status of the system. As a safety feature, signal light 64 variably provides a visual red, green, and yellow light to identify the state of operation. Monitoring software or other trigger switches can cause the signal light to respond to any of numerous situations by displaying a selected color, such as for normal system operation, system inactivity, current surge, low liquid level, clogs or unusual pressures in system components, expiration of maintenance interval, and the like.

Figure 2:
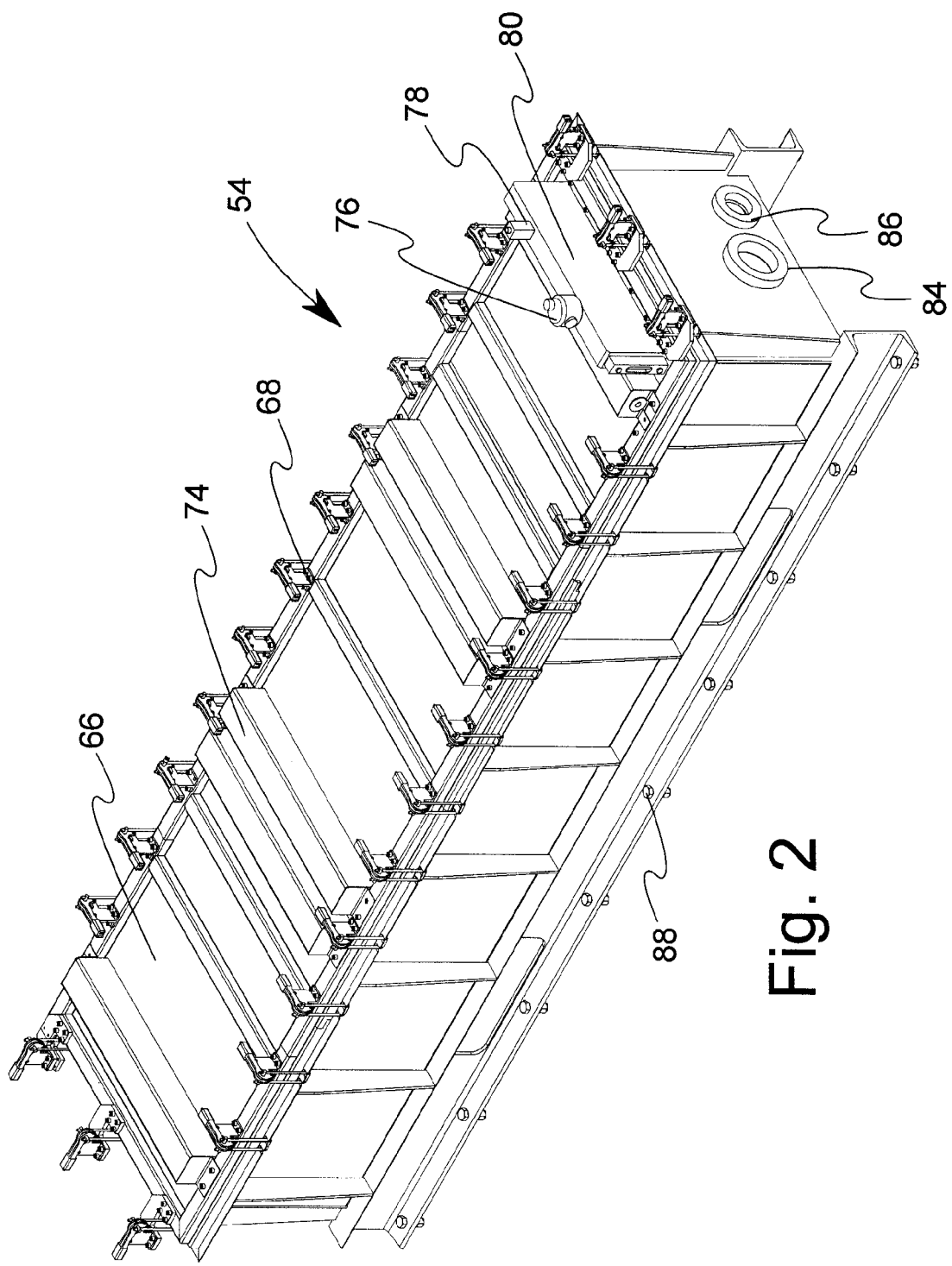
FIG. 2 is an isometric view of the reactor tank.
Figure 3:
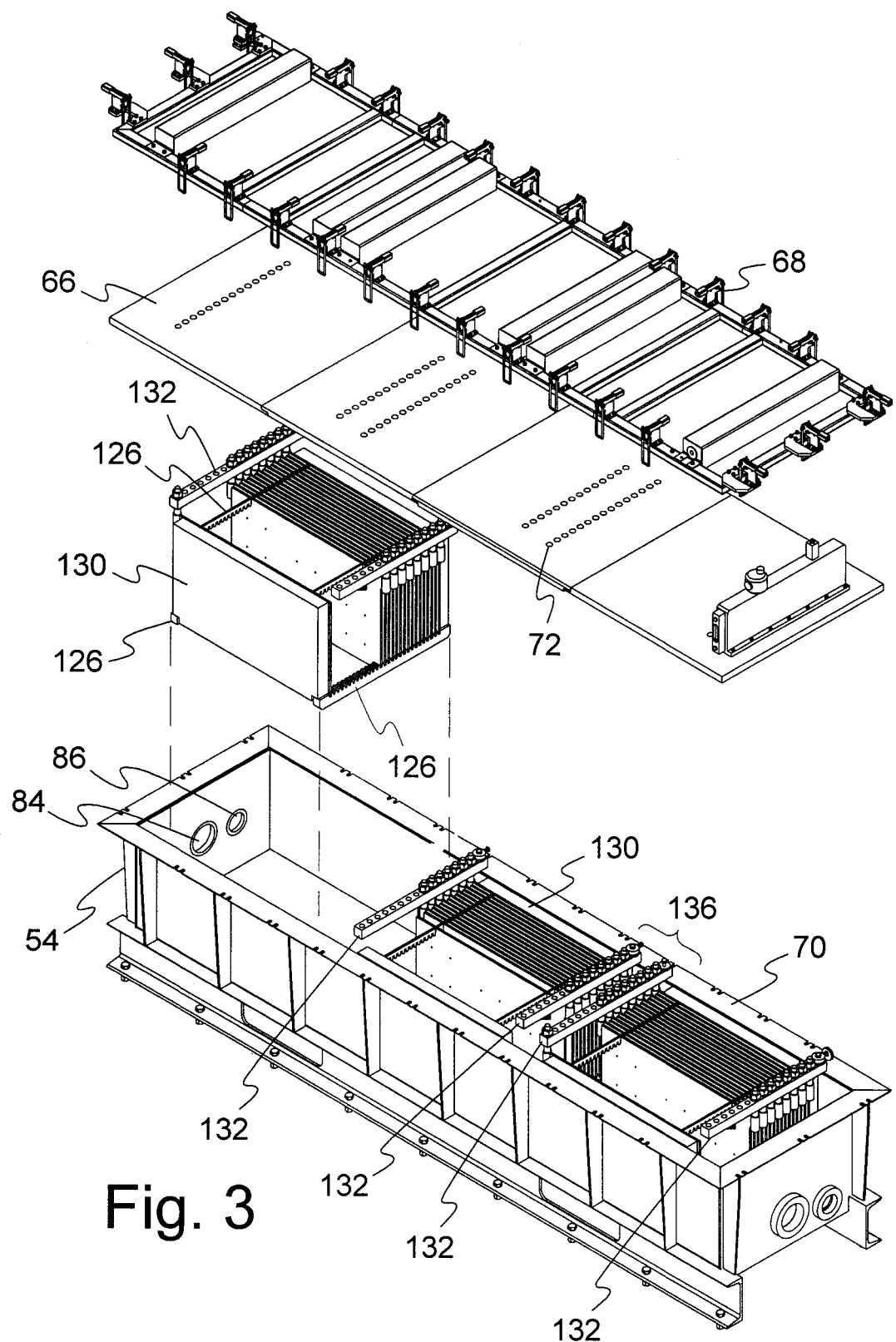
FIG. 3 is an exploded view of the reactor tank, with a portion of the electrodes in each electrode set omitted for clarity.

FIGS. 2 and 3 show further details of reaction chamber 54 and the electrode assemblies that are installed in the reaction chamber. The tank is coated in non-conductive material. While the reaction chamber 54 primarily is a tank, it is equipped with sensors, valves ports, and volumetric controls that enable fluid flow and provide safety of operation. The reaction chamber includes one or more lids 66 and a clamping system for securing the lids 66 in place during operation. The clamping system allows the lids to be opened or removed when electrodes are to be removed or installed.

The lids 66 are plastic or otherwise non-conductive plates that fit on top of the reaction chamber tank 54. The number and size of such lids 66 are variable according to the size of the tank 54 and the size or weight of a lid panel 66 that is conveniently handled. Top clamping assemblies 68 secure the lid panels to the top of the reaction chamber tank 54. The top edge of the tank has a flat, laterally extending flange 70 that supports the lid panels 66 and provides engagement for the clamps 68 to secure the lids 66 in place. A tightly clamped lid allows a reaction chamber to be pressurized, but in part, the clamps 68 are a safety feature that helps contain liquid in the tank and also helps to guard against a foreign object falling into the tank. In any electro coagulation system, it is desirable to prevent any object from causing two electrodes to arc, as this might damage the power supplies. Requiring that lid panels are clamped in place before operation both protects the operator from the result of such arcing and protects the electrode plates from accidental entry of a foreign object. The clamp assemblies can be opened and removed when access to the tank is required.

For safety, the lid panels form holes 72 that receive electrode posts, enabling the lids to fit snugly against the tops of fastening nuts on the electrode posts. Thus, the fit of the lids ensures that the nuts are fastened down and further ensures that the nuts do not back off and fall into the tank, where a nut could produce an arc. As a further safety measure, where the lids receive the protruding electrode posts, the post ends and lid are covered by non-conductive safety covers 74, which isolate the high DC power going into the electrodes.

Figure 7:
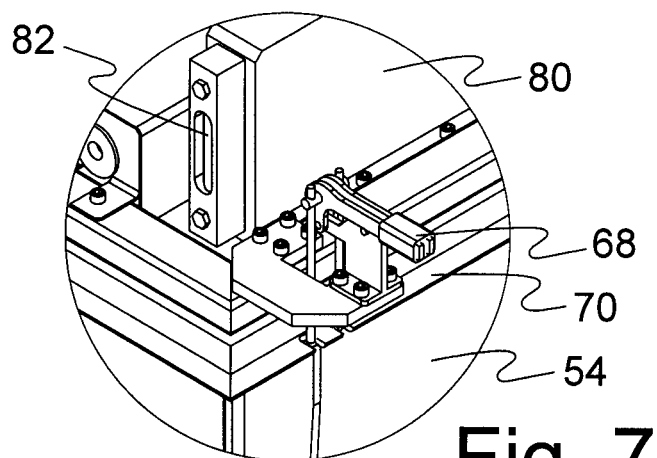
FIG. 7 is an enlarged detail view of an end of the reactor tank, showing the fluid level management system.

During operation, the reactor tank 54 should be sufficiently filled to a predetermined level, such as to cover the electrode plates. FIGS. 2 and 7 show one or more devices for ensuring that liquid level is sufficient. An electronic water level detector 76 checks liquid level. A hydrogen vent valve 78 is the normally open to vent the hydrogen, which otherwise could build up in the reaction chamber and cause a low liquid level. Hydrogen is a normal byproduct of electro coagulation. A hydrogen collection box 80 collects excess hydrogen and is ported to allow for safe removal from the area. A sight glass 82 on the hydrogen collector box allows the water level in the reaction tank to be visually checked. Operating software controls the water level of the reactor tank by closed loop logic that maintains optimal electrode submersion using the back end variable pump 50 to throttle the speed of the water leaving the system.

The opposite longitudinal ends of tank 54 each form two ports 84, 86 for pipe connections. One port of each pair can be plumbed for input or output of process fluid, while the other port at each end can be plumbed for input or output of water for flushing. For example, FIG. 2 shows a larger port 84 and a smaller port 86 at the right end of the reaction chamber 54. The larger port 84 can be the exit port for processed water, while a similar larger port 84 at the opposite end of the tank, best seen in FIG. 3, is the inlet for process water. A smaller port 86 shown in FIG. 2 can be an exit port for flush water, to be used when maintenance is being performed. A similar, smaller port 86, FIG. 3, at the opposite end of the tank is the inlet port for flush water. Thus, the left end of the tank in FIGS. 2 and 3 may be considered to be the incoming end of the reaction chamber tank, while the right end is the output end. The two ports 84, 86 on each end are of different sizes to ensure that connections for process water and flush water are not confused.

Figure 10:
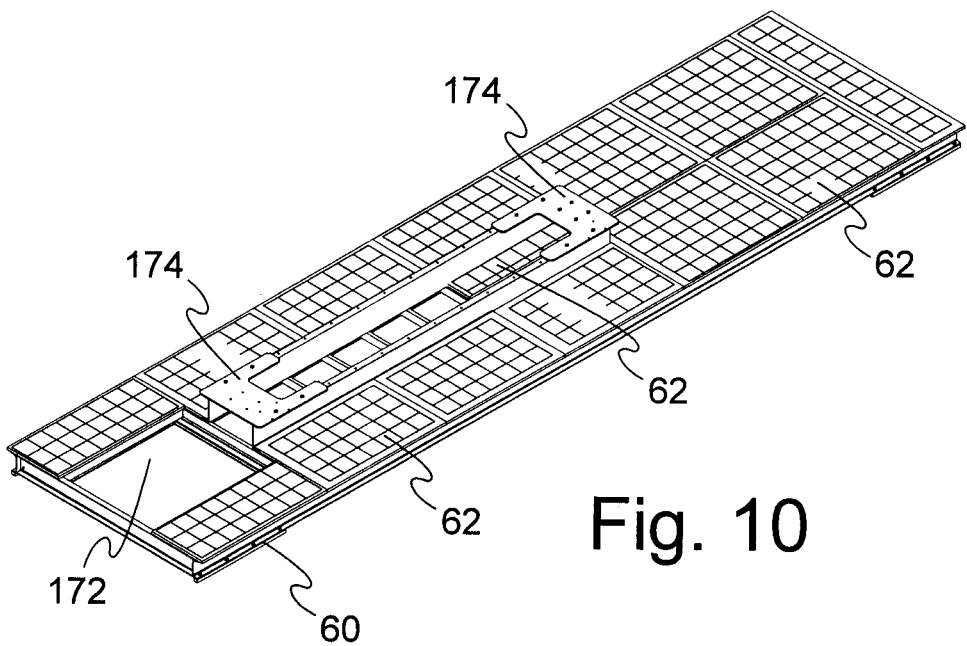
FIG. 10 is an isometric view of a raised floor that mounts the reactor tank.

The reaction chamber tank 54 is secured to the base framework 60, FIG. 10, or superstructure floor 62. The base of tank 54 includes a securing flange that receives fasteners such as bolts 88 that are used to secure the tank to the raised spill containment floor 62 or base 60.

To achieve high flow rates, electrodes can be arranged in subassemblies that can function independently while coordinated with other electrode subassemblies. Various arrangements of subassemblies are possible, allowing each subassembly to be used singularly or in combinations, in series or parallel with others, to initiate a sequence of reactions to destabilize ions and particles from the process liquid. Multiple electrode sets are used to provide optimal performance. Each reaction chamber can have different geometry and employ different voltages and amperes, using different anode or cathode materials. Different treating materials, such as acids, bases, polymers and recycled flow from other chambers or effluents can be used in each chamber and may be added at any point in the process. Different contaminants are removed by different reactions within different chambers, used in series or in parallel. The goal of treatment is to remove the contaminants in an efficient manner and is based on the knowledge of correctly developing the pattern of treatment for the wastewater to be treated. These treatments may employ numerous methods and materials, including different chambers in combination, with added materials, backwash, and recycled waters.

Figure 15:
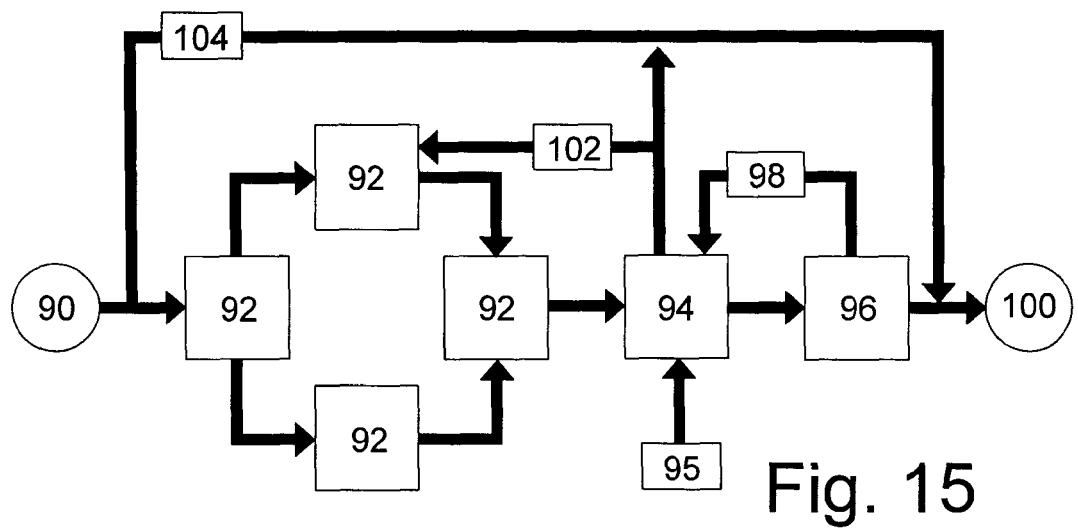
FIG. 15 is a schematic diagram showing an integrated water system using multiple treating processes.

As an example of how plural electrode subassemblies might be used, FIG. 15 shows operation of an integrated water system that employs electro precipitation and other processes, which may include recycling, backwashing, adding materials, and monitoring. The initial part of this example shows that different portions of an influent can be treated by different techniques, in some cases to determine which process steps are more effective. Thus, as a first step, a flow of influent 90 enters plural reaction chambers 92 to be treated. Each of the chambers 92 may apply one or more treating technologies to the influent. In general, each chamber 92 can have its own distinct characteristics, which might include a unique geometry, unique electrical treatment by independent selection of voltage and amperage, and unique choice of materials used as the anode/cathode pair. These technologies further include electro precipitation treatment, magnetic treatment, ultraviolet treatment, monitoring pH, monitoring conductivity, and radio transmission. One purpose of employing a plurality of unique processes and monitoring the result is to evaluate the results of each treatment on the particular influent, so that an effective treatment can be applied to the influent.

Another aspect of treating influent 90 is to determine whether recycled flow is beneficial or whether chemical supplements should be added. Supplements can be added at any point in the processing steps. As a non-limiting example, additions can be made after the influent has been treated in one or more reaction chambers 92. The treated influent can be passed to modification chamber 94, where one or more materials are added at step 95 to the influent to produce a modified process liquid. The results of the prior monitoring steps may guide the selection of which materials to add. These materials may be chosen from acid, base, other chemicals, ozone, and polymers. The modified process liquid from the modification chamber 94 passes to a holding and discharge chamber 96.

In some cases a percentage of treated water can be reprocessed or recycled to act as a precipitation seed in upstream reaction chambers. For example, part of the modified process liquid from chamber 96 may be returned to the modification chamber 94 through a backwash line by a backwash step 98, while another portion of the modified process liquid is discharged as an effluent 100. In another example, a portion of the modified process liquid 94 may be returned to one or more of the treating chambers 92 in a recycle seeding step 102. Thus, partially or fully treated water can be returned to an upstream location, where it improves reactivity and allows processing at higher flow rates.

Bypassing is another technique for treating influent. Certain amounts of untreated influent can be treated by bypassing from any point to any prior or subsequent point. For example, a bypass line 104 allows a portion of the incoming influent 90 to be routed through the bypass line 104 for direct mixing with discharged effluent 100 to treat the mixed influent. Bypassing also may be practiced from intermediate points in the processing. For example, a portion of the partially treated influent, such as a portion of modified process liquid from modification chamber 94, may be routed to the bypass line 104 for preliminary mixing with influent 90 to treat the influent before it mixes with final effluent 100.

The ability to treat a body or volume of water by mixing with previously treated water improves the ability to process high volumes of water by electro precipitation. Reaction chambers 92 are efficient in initiating the destabilization process. As a result, the destabilization process will continue with respect to many contaminants when the treated water is mixed with other non-treated water. This type of treatment allows water to be bypassed and treated only by mixing.

Tests for effectiveness of treatment were conducted using raw pond water with known bacterial content. Samples of raw pond water were treated entirely by adding flowback water that had been processed using electro precipitation. Samples were tested for microbial adenosine triphosphate (ATP) using standard test kits such as the kit sold under the trademark LuminUltra Quench Gone Aqueaous (QGA) test kit. The test kit measures living bacteria and plankton levels by analyzing for cellular ATP to directly determine the total microbiological concentration. Measurement is taken in pico grams per milliliter (pg/mL).

Samples were taken of raw pond water in the following percentages: 100%, 90%, 50%, 25%, 10%, and 0%. The balance of each sample was made up of 100% treated flowback water from electro precipitation. The test kit was used to evaluate the samples at two different times. The samples were tested the first time within thirty minutes of treatment and mixing. Samples were tested the second time three hours later. The 100% raw pond water showed an ATP content of 94,815 pg/mL. The 100% flowback water showed an ATP content of 2038 pg/mL (98.6% removal) at the time of the first test and 903 pg/mL (99.3% removal) at the time of the second test, three hours later.

Results show that bacteria levels in the samples mixed with raw pond water decreased with time after exposure to flowback water that had been electrically charged by electro precipitation. At thirty minutes, the 50% sample showed 81.1% removal and the 25% sample showed 96.3% removal. At three hours, the 90% sample showed 82.5% removal, the 50% sample showed 98.3% removal; the 25% sample showed 98.8% removal, and the 10% sample showed 99.6% removal.

The test results suggest that treated flowback water is effective to further reduce bacteria levels in raw water. Notably, three hours after mixing, a 50% mixture or raw and treated water has a bacterial content nearly equivalent to 100% flowback water that was treated by electro precipitation. Even the 90% raw water mixture showed an eventual high removal of bacteria at 82.5%. Consequently, it appears that high treatment rates can be achieved by treating a limited portion of a volume of raw water by electro precipitation to lower bacteria levels, and then mixing the treated water with raw water to further lower bacteria levels over time in the mixed raw water.

Tests were conducted to determine how the applied power level in a reaction chamber influenced removal of various metals in acid mine drainage water. Samples with an initial acidic pH of 3.7 were tested for removal of cadmium, lead and zinc at two power levels, where one power level was thirty percent less than the other. It was found at the higher power level that removal of the respective metals as 99.6, 99.6, and 99.8% and the pH increased to 7.81. At the thirty percent lower power level, the respective removal rates were 78.3, >99.7, and 98.5% and the pH increased to 6.7. From these results, it appears that power level is a significant factor in achieving desired levels of metal removal and pH modification and should be evaluated against processing cost and allowable metals levels in the effluent stream.

Tests were conducted to determine the effect of pH adjustment before processing acid mine drainage water to remove cadmium, copper, iron, lead, and zinc. In a first test run, water was treated at its initial acidic pH of 5.7. Removal of the respective metals was 28.6, 96.4, no reading, >18.54, and 63.14%. In a second test run, the pH was increased to 7.2 before entering the reaction chamber. Respective removal rates for the metals were 63, >97, 55.8, >84.7, and 96%, and resulting pH was 6.56. It was learned that adjusting pH in advance of treatment can enhance removal rates and influence resulting costs.

Electro coagulation and electro precipitation (EP) processes were tested for effectiveness in processing flowback water from fracturing wells, using sacrificing and non-sacrificing anodes and cathodes. A well is fractured to stimulate or prolong oil & gas production. Fluids are pumped into a wellbore to cause pressure to crack or fracture the formation. Contaminated flowback water from fracturing frequently needs to be cleaned. EP processing was used to remove a variety of contaminants from wastewaters.

EP was found to be effective to precipitate clays, bacteria, heavy metals, both divalent and monovalent cations and anions, oils, greases, and other organic compounds. In general, the removal of divalent cations such as Ca, Ba, Sr, Mn, Mg, and others is about 20% to 40% depending on the water chemistry and concentration of materials in the water. Chlorides are mostly removed as chlorine gas at removal rates in the range from 10% to 20%. Sulfates and carbonates are removed at about 20% to 40%, although in the presence of high bicarbonate or sulfate levels, removal rates exceeded 95%. Silica, clays, total suspended solids (TSS), bacteria, uranium, and heavy metals such as Zn, Pb, Cu, and Ni were generally removed at 95% levels and above. The EP process was also used to remove colloids and bacteria, and to reduce total dissolved solids before reverse osmosis (RO) treatment to prevent fowling and scale build up in the RO systems, as well as to reduce salt load in RO systems.

Sodium and potassium were generally not significantly removed by the EP process, although sometimes they bind with and are removed with clays. The total dissolved solids (TDS) were generally removed by about 15% to 20% depending on the types of contaminants present. This level can sometimes be increased by the addition or blending of waters containing sulfates, phosphates, bicarbonates, or other material that assist in the precipitation process.

For many contaminants, sacrificing anodes and cathodes were found to achieve equal or higher removal rates than non-sacrificing electrodes. The conclusion followed for bacteria levels, barium, calcium, iron, magnesium, silica, silicon, sodium, strontium, chloride, and TDS. For slightly alkaline flowback water of pH 7.57, sacrificing electrodes lowered pH to only 7.09, while non-sacrificing electrodes lowered pH to 6.48. These results suggest that process water should be monitored for contaminant content and, in some cases, the electrodes should be selected or changed to achieve best removal rates.

Figures 16, 17:
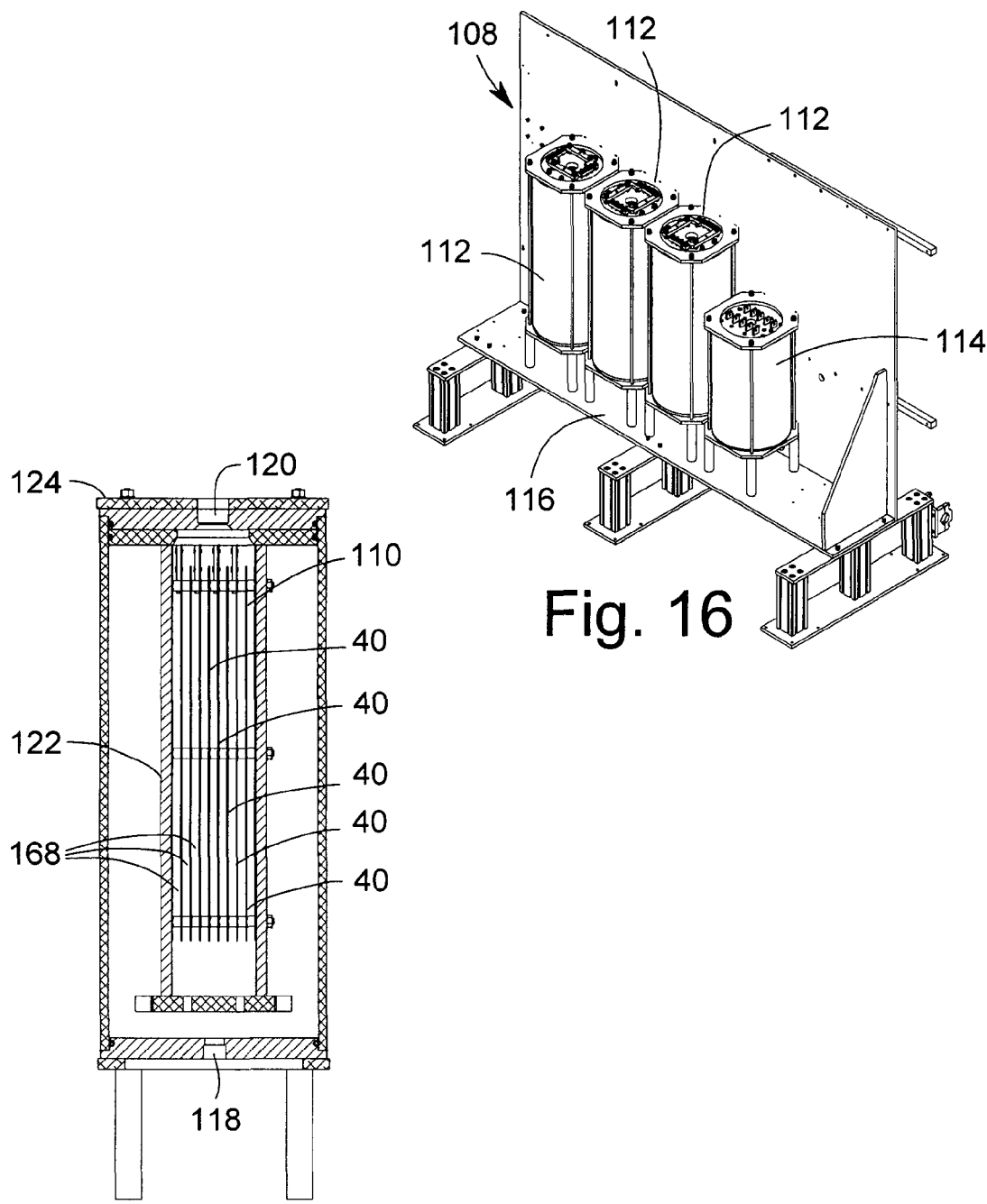
FIG. 16 is an isometric view of a modular processing system.
FIG. 17 is a vertical cross-section taken through a modular reaction chamber with flat electrode plates.

With reference to FIG. 16, in order to provide flexible response to needs of particular process water or to expedite maintenance operations, an electro-processing system 108 may be structured of readily exchanged components. Plural electrode sets 110, best shown in FIG. 17, may be separated into individual housings or reaction chambers. Each reaction chamber may be modular, so that it can be added to or removed from a system with relative ease. Each reaction chambers may contain electrodes of preselected characteristics, and the reaction chambers may be configured in different shapes and sizes. For example, reaction chambers 112 may be configured as relatively tall cylinders, while reaction chamber 114 is configured as a relatively shorter cylinder. All reaction chambers within the same system are mounted in close proximity on a supporting framework 116. Interconnecting water lines can joint the reaction chambers in any order and provide input and output at any point.

FIG. 17 shows internal structure of a reaction chamber, where a set 110 of electrode plates receives process water in vertical flow pattern. A bottom inlet 118 and a top outlet 120 define the flow path. The plate set 110 is mounted in a carrier 122 that is suspended from a chamber lid 124, allowing the entire plate set to be quickly extracted from the housing for replacement.

Figure 4:
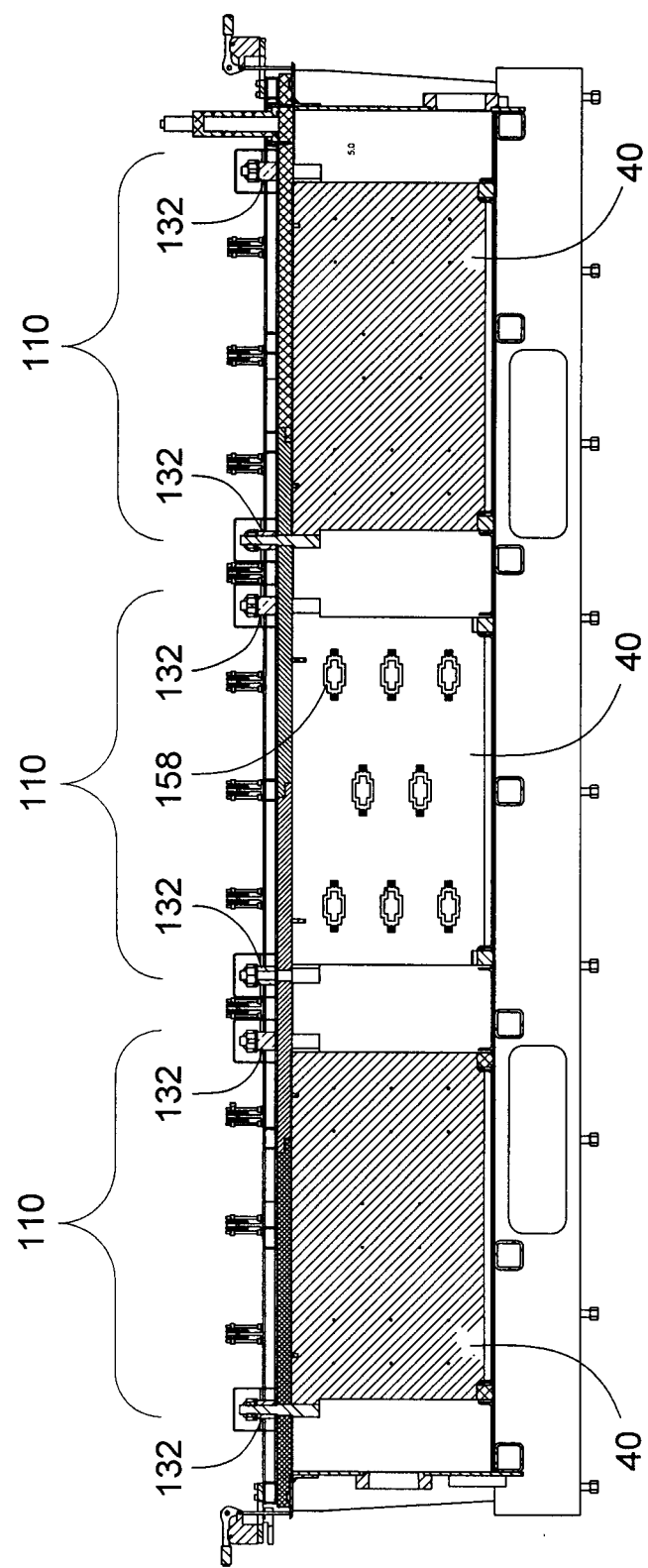
FIG. 4 is a longitudinal vertical cross-section taken across the center of the reactor tank.
Figure 5:
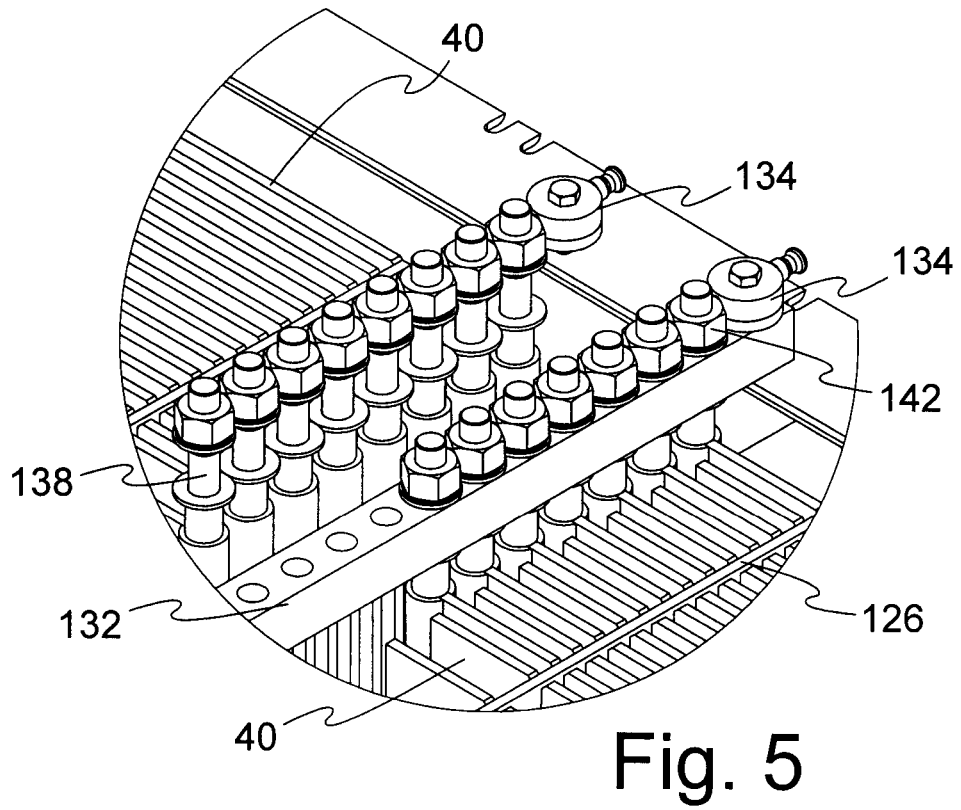
FIG. 5 is an enlarged detail view of the electrodes from two juxtaposed sets of electrodes, showing the attachment of nearer set to a bus bar. The bus bar of the further set is omitted to better show the connection to electrodes.
Figure 6:
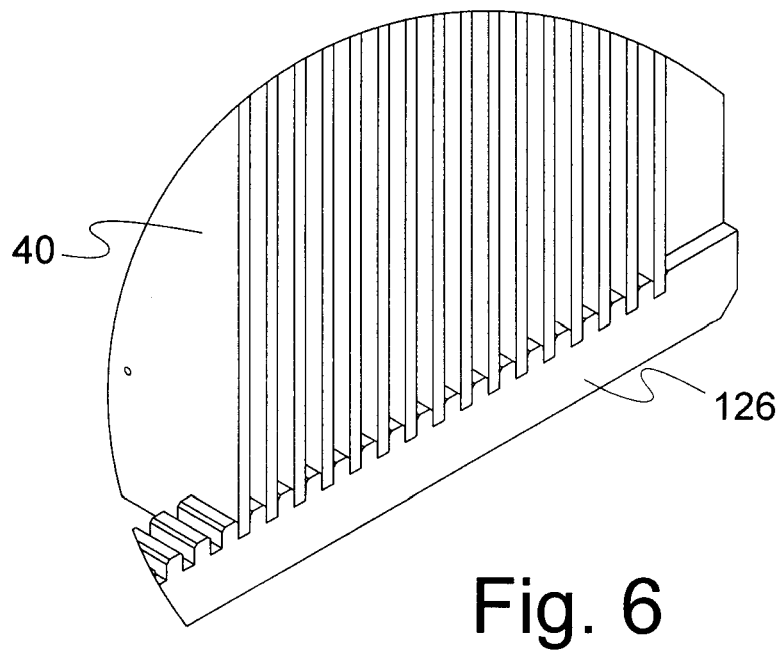
FIG. 6 is an enlarged detail view of the electrodes in a set, showing their registration in a spacer that holds the electrodes with a predetermined spacing, and with electrodes near the left side of the drawing omitted for clarity.

FIGS. 3, 4, 5, and 6 show a specific embodiment using plural electrode subassemblies and their installation into a single reaction tank 54. In the long, single tank 54, subassemblies of electrodes 40 are arranged in cells or sets 110. Within each cell or set 110, the electrodes are spaced apart to provide a flow path between each stacked pair of electrodes within the set. A pair of non-conductive top and bottom spacers 126 maintains the electrodes in parallel, at a preselected spacing, and establishes the flow path. The top spacer 126, best shown in FIGS. 3 and 5, is a nonconductive spacer that is used to hold the electrodes together at the top when they are inserted into the tank 54. The electrodes may have notches 128, FIG. 9, to receive the top and bottom spacers. This top spacer is installed last, before the lids 66 are clamped down to make the system water-tight. Different spacers can be used to vary the width of the flow path. Optional plastic end spacers 130 allow the electrode spacing to be changed to a larger dimension by removing the end spacers.

A set 110 of electrodes typically is formed of two groups of electrode plates. Electrode plates 40 typically are flat and formed of conductive material. In a popular orientation, each electrode plate 40 extends vertically within a reaction chamber. Electrical means such as a power supply is connected to each of the electrodes 40. The electrical means delivers electricity of a first polarity to the first group of electrodes 40 and delivers electricity of an opposite polarity to the second group of electrodes 40. The first group is in an alternating relationship with the second group, such that an electrode 40 of the first group extends between adjacent electrodes of the second group. Similarly, an electrode 40 of the second group extends between adjacent electrodes of the first group.

The electrodes of a set 110 can be connected to one or more power supplies 34, 36. The number of power supplies is sufficient to allow each electrode set 110 to be electrically independent of other electrode sets. According to a typical arrangement, the electrodes within a set are connected to one or more power supplies in such a way that every other electrode in the alternating series of plates is an anode, while the remaining alternate or intermediate electrodes in series are cathodes. Further, the sets are arranged and connected to a power supply so that an anode of one set is not precisely aligned with an anode of the next, juxtaposed set; and correspondingly a cathode of one set is not precisely aligned with a cathode of the next juxtaposed set. In this way, the flow path that a process liquid encounters while flowing from set to set encounters an irregular charge field, causing turbulence in the liquid and thereby enhancing the effectiveness of the electro coagulation process.

An efficient design of component parts such as spacers 126 provides interchangeable, identical parts for all electrode sets. To best accommodate the use of identical parts in all electrode sets, the electrodes of each set are aligned with the electrodes of the juxtaposed set. However, the electrodes of each set are connected with opposite polarity to the electrodes of the juxtaposed set. This alignment of electrodes with opposite polarities establishes aligned flow paths between electrode pairs of successive sets, but with reverse polarity at each successive set within the same flow path. A process liquid following a single flow path that extends through multiple electrode sets will see the polarity reverse as it travels from set to set. Each polarity reversal increases turbulence in the liquid and thereby enhances the effectiveness of the electro coagulation process.

The electrode sets 110, FIG. 4, are best arranged with an electrical connection point for each electrode plate at a longitudinal end of the electrode plate 40. The electrode plates can then be arranged into two interleaved groups defining a single set by alternating the positions of the electrical connection points. Thus, all of the electrical connection points of one group are at one end of a set, e.g. the right end of a set in the view of FIG. 4. This group can be connected to the same bus bar 132 as anodes; and all of the electrical connection points of the second group are at the second end of a set, e.g. the left end of a set in the view of FIG. 4. The second group can be connected to a different bus bar 132 as cathodes. In the most conventional arrangement, the electrode plates are arranged in one-to-one alternating sequence, such as anode-cathode-anode-cathode . . . etc. The terms, "anode" and "cathode" should be understood to refer to the momentary polarity of an electrode, used to distinguish between the two groups of electrodes in a set having instantaneous polarities. Polarity can be reversed at any time by changing the polarity of the appropriate bus bars 132.

FIG. 3 shows electrodes arranged in three sets or subassemblies within a single reaction chamber. The subassembly at the left of the view is in a raised or exploded position. Each set is separately powered by a one of the independent power supplies 34, 36 for electrolytically treating the process water. Each set is separately controlled through adjustment of its own power supply. In order to conveniently connect a power supply to all anodes or all cathodes of a set, a bus bar 132 is positioned at each side of the electrode set. Within a single set, all of the electrodes intended to share one selected polarity are arranged with their electrical connection points at one side of the set, and these are connected to a first bus bar 132. All of the electrodes intended to share the opposite selected polarity are arranged with their electrical connection points at the second, opposite side of the set, and these are connected to a second bus bar 132. Accordingly, all of the anodes can be powered by attaching a positive lead to one of the bus bars 132 of a single set, while all of the cathodes can be powered by attaching a negative lead to the opposite bus bar 132 of the same set.

A power supply 34, 36 provides a pair of oppositely polarized cables 134 for powering the oppositely charged bus bars 132 of each electrode set. As an example, FIG. 5 shows neighboring electrode sets with a bus bar 132 along the side edge of one of the sets. A similar bus bar 132 is omitted from the juxtaposed edge of the second set in order to more clearly show the electrode connections at the edge of the second set. A power supply cable connection 134 of a first polarity would be attached to each of the bus bars 132 of FIG. 5. The cable connections 134 are shown in appropriate positions even for the omitted bus bar 132. Although not shown in FIG. 5, bus bars 132 would be identically located along the opposite sides of each of the two electrode sets; and power supply cable connections 134 of the second polarity would be attached to those bus bars 132. The polarity of all electrodes connected to the same bus bar 132 can be set as an anode or as a cathode or reversed from such setting by appropriately controlling the output of the power supply through polarity setting device 38.

Each set of electrodes is polarized positively and negatively according to the instantaneous polarity applied to the bus bars 132 located at the opposite ends of the set. As described, each end of each set can be separately controlled to be either positive or negative. Software controls provide that sets of neighboring bus connections 136, FIG. 3, are of matching polarity even when polarity is reversed. Control loop logic provides that the positives are always paired together and the negatives are always paired together during the polarity reversal event.

Figure 9:
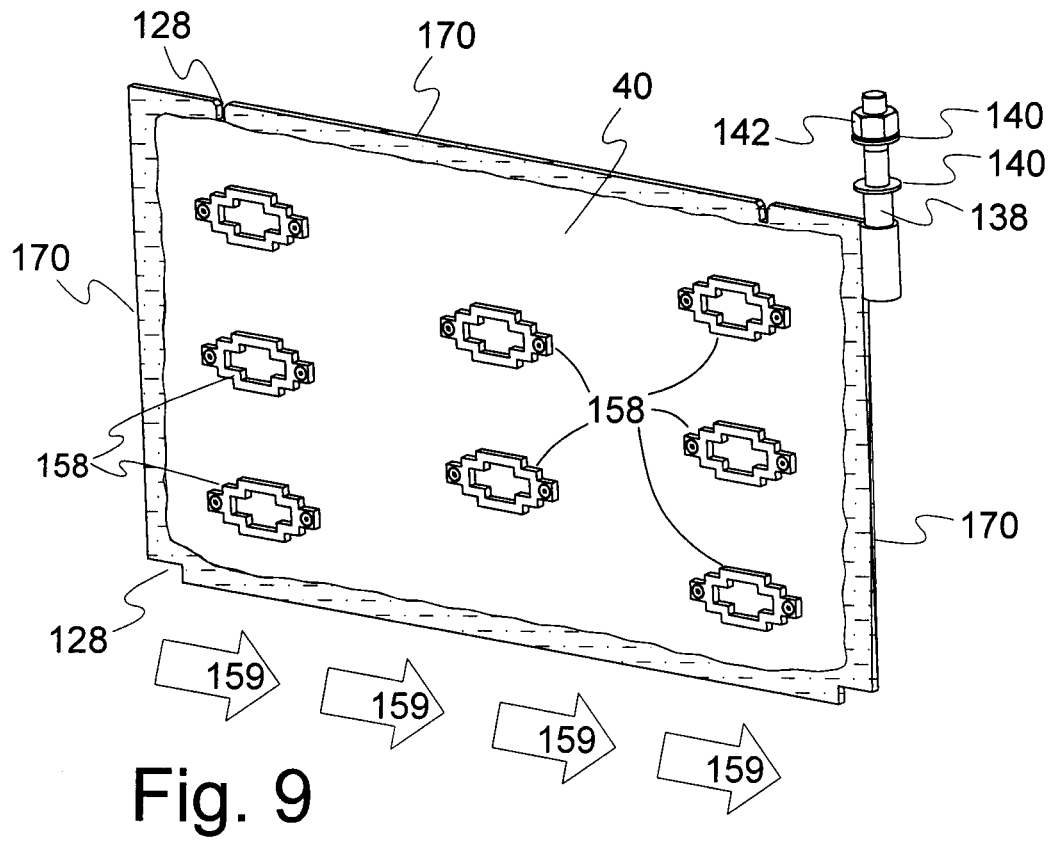
FIG. 9 is an elevational view of a major face of an electrode, showing electrical attachment structures at an edge and showing turbulence inducing structures on a major face.

As shown in FIGS. 3-5, electrodes 40 are bolted to a bus bar 132. A common bus bar 132 serves all electrodes of one polarity in an electrode set, while a second common bus bar 132 serves all electrodes of the opposite polarity in the set. As best shown in FIGS. 5 and 9, the electrical connection points for the electrodes 40 are an attachment post 138 that is located at a side edge of the electrode. Suitable methods for attaching the post 138 to the electrode plate are by either welding on or screwing on the post to the flat electrode plate material. The attachment post is provided with two, vertically spaced apart shoulders 140. The post and shoulders are configured to ensure that good electrical contact is achieved when the electrode is tightened onto the bus bar. The top shoulder is variable in separation from the lower shoulder so that the lower shoulder will contact the bottom of the bus bar while the top shoulder contacts the top of the bus bar when a fastener, such as nut 142, secures the post to the bus bar. These shoulders 140 provide a double contact to the bus bar. Corrosion tends to become a failure mode when multiple electrodes are being connected to a common bus. These double shoulders ensure that electrical conductivity is made with each electrode on the bus bar.

A reaction chamber can be operated by powering every electrode, but this technique is not always desirable. In order to improve processing at reduced power cost, a method has been discovered for processing the influents while powering fewer than all electrodes. Some plates within a reaction chamber or electrode set can be powered while others are non-powered, while still processing the influent. This technique is enabled by configuring bus bars 132 to have the modified ability to carry full current to only some of the attached electrodes.

One embodiment, which is called the "first and last," places power only across a set by powering only one electrode in each group. The selected electrodes are the first and last electrodes in the set, such as to the first anode at a first end of a set and to the first cathode at the second end of the set. Powering only the first and last plates in a set works well if the water is very conductive. This technique allows strong reactions with less power use because of the conductivity of the water.

Figure 18:
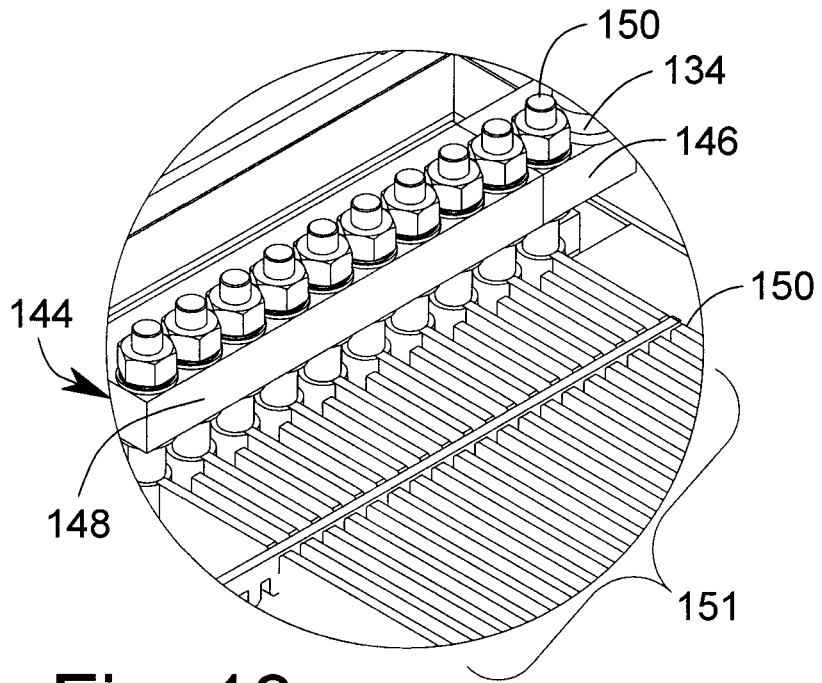
FIG. 18 is an isometric view of a fragmentary detail of an electrode set, showing an example of a typical bus bar in a first-last powering of electrode plates.

FIG. 18 shows an enablement of powering only the first and last plate in which a modified bus bar 144 is formed of two elongate sub-portions, wherein one sub-portion 146 is formed of conductive material and the second sub-portion 148 is formed of nonconductive material. According to FIG. 18, a first modified bus bar 144 is placed along a first side of the electrode set, where it is connected to a first group of electrodes that normally shares a same first polarity. The conductive sub-portion 146 extends from one end of the first bus bar through the connection point 134 for a first power supply cable and through the neighboring connection point to the first electrode plate 150 in the first group, which is powered to have a first polarity. Thus, the first cable 134 powers the first electrode plate 150 of the first group, applying the selected polarity of first cable 134 to only the first electrode plate of those attached to the first bus bar 144. The remaining length 148 of first bus bar 144 is formed of nonconductive material. All of the remaining electrodes 151, shown in a bracket, with connectors at the first bus bar are attached to the nonconductive sub-portion 148, with the result that such remaining electrodes of the first group are not directly powered from the first bus bar.

In the scheme of FIG. 18 for powering only the first and last plates in a set, every second electrode in the electrode set typically is part of the second group of electrodes attached to a second bus bar at the second and opposite side of the electrode set. The powering scheme is substantially identical to the powering scheme for the first group, but the electrodes are in a mirror image to the illustrated scheme for the first group. A second modified bus bar 144 can be used at the second side of set 110 by placing the conductive end in the opposite direction from first bus bar 144. The second modified bus bar is structured like the first, with a conductive sub-portion that extends from an end of the second bus bar through the connection point for the second cable and through the connection point for the first electrode plate 150 of the second polarity. The remaining length of second bus bar is formed of nonconductive material. All of the remaining electrodes 151 with connectors at the second bus bar are attached to the nonconductive sub-portion, with the result that they are not directly powered from the second bus bar. The resulting electrode set using modified bus bar 144 at each side of the set is powered from only the first and last plates in the set.

The "mini-cell" is another embodiment that processes the influent while requiring less power. The series of electrode plates in a set can be divided into selected sub-groupings that are powered. Other sequences of electrode plates in each group are non-powered. The bus bar is structured to conduct the current to some, but not all, of the electrode plates. Powering just some of the plates uses less current than powering all of the plates. The number of plates that must be directly powered is determined by such factors as conductivity, water chemistry, identity of contaminants to be removed, other chambers to be used, and materials added.

Figure 19:
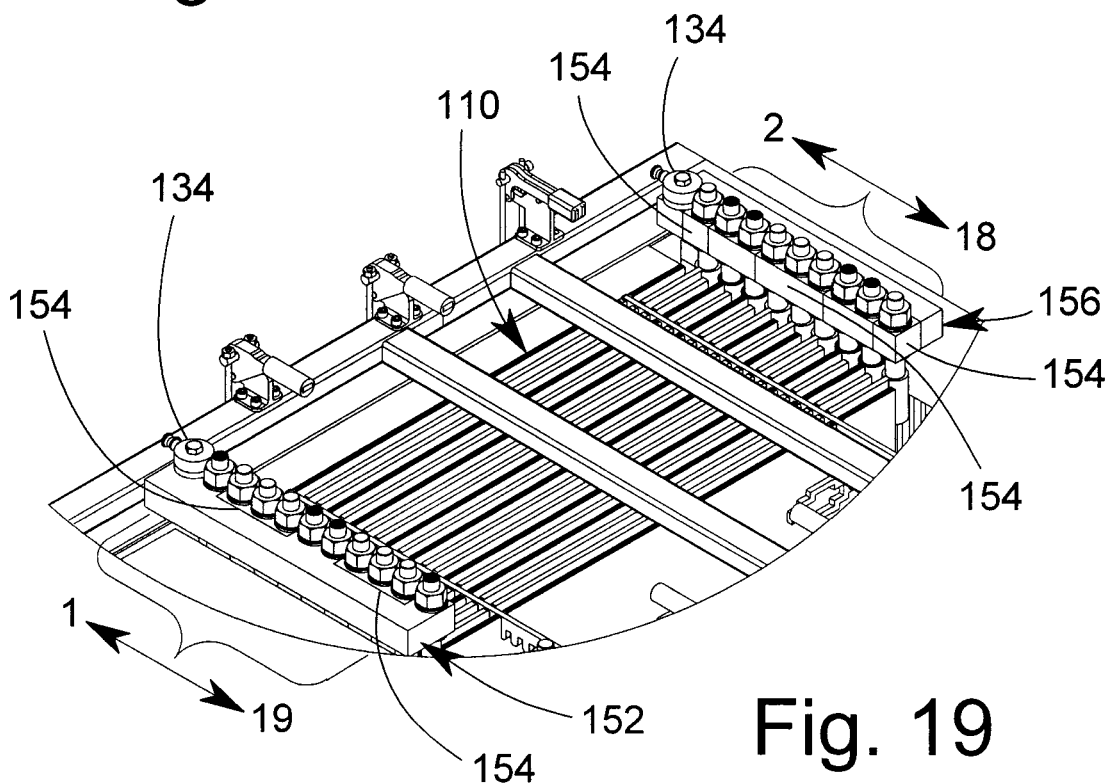
FIG. 19 is an isometric view of a fragmentary detail of an electrode set, showing an example of powering bus bars in a mini-cell powering of electrode plates.

FIG. 19 shows an example of a mini-cell by illustrating a structure for bus bars at the opposite sides of an electrode set 110. The ordering of the electrode plates may be as previously described, with a first group composed of every other plate bolted to the bus bar on a first or left side of the set according to the view. A second group, composed of the alternate plates to the first group is connected to the bus bar on the second or right side of the set, according to the view. The bus bar 152, shown on the left side in the view of FIG. 19, is modified to be composed of a plurality of conductive and nonconductive areas. Those two types of areas are arranged in alternating sequence through the length of the bus bar. In contrast to bus bar 144, bus bar 152 must provide power to multiple powered areas along its length. For this reason, bus bar 152 may be formed of conductive material extending for substantially the entire length of the bus bar, delivering power from cable connection 134 to plates attached at any powered point on the bus bar. Nonconductive areas are established by insetting local sections of nonconductive material to the otherwise conductive bus bar. For example, a nonconductive reception region for bolting on an electrode plate might be formed by inserting a nonconductive sleeve into a bolt hole in the bus bar. In FIG. 19, the conductive bus bar is partially cut away and replaced by a nonconductive insert 154 wherever it is desired to attach non-powered plates. The insert 154 includes both appropriate bolt holes to receive the plates and sufficient surrounding material to fully isolate the attached plates from the conductive portion of the bus bar.

In FIG. 19, conductive bus bar 152 carries nonconductive inserts 154, each of a width and length to receive one or more electrode connections. FIG. 19 further shows each insert to be sized to receive from one to three electrode connections, and the bus bar includes a plurality of such inserts set into the bar at spaced intervals along the bus bar. For purposes of example, the arrangement of powered and non-powered electrodes will be described for an ordered series of electrode plates consisting of the first nineteen plates in the set, with the odd numbered plates attached to bus bar 152 and the even numbered plates attached to the opposite bus bar 156.

The illustrated bus bar 152 is connected to the odd numbered electrode plates, starting with number one, as indicated by the odd plate numbering 1-19 shown by a bracket at the left of the view. As a visual aid, the powered plates and fastening posts on bus bar 152 have shaded tops. FIG. 19 shows a conductive end that receives the power supply connection 134. A further portion of the conductive bar powers plate number one. A nonconductive insert next insulates plates number three, five, and seven. A continuation of the conductive part of the bar powers plates number nine and eleven. Next, another nonconductive insert insulates plates number thirteen, fifteen, and seventeen. Another continuation of the conductive part of the bar powers electrode number nineteen. A similar pattern may continue thereafter.

On the opposite, right side of the electrode set, conductive bus bar 156 is connected to the even numbered electrode plates, starting with number two, as indicated by the even plate numbering 2-18 shown by a bracket at the right of the view. Continuing with the previously described visual aid, the powered plates and fastening posts on bus bar 156 have shaded tops. According to FIG. 19 a conductive bar end receives the power supply connection 134. Next, a nonconductive insert 154 insulates plate number two. A continuation of the conductive part of the bar then powers plates number four and six. Next, another nonconductive insert 154 insulates plates number eight, ten and twelve. Then, another continuation of the conductive part of the bar powers plates number fourteen and sixteen. Next, a further nonconductive insert 154 insulates plate number eighteen. As before, a similar pattern may continue thereafter.

In addition to showing the division of an electrode set 110 into mini-cells, FIG. 19 also shows that a series of electrode plates in sequence can be powered with the same polarity to increase reactivity. For example, even numbered powered plates four and six constitute a pair of plates, and this pair is attached to a single bus bar 156. Plates four and six are in consecutive positions and thus constitute a series of electrode plates powered with the same polarity. Odd plate number five falls between plates four and six and is attached to opposite bus bar 152. However, plate number five is non-powered. In addition, non-powered plates number three and seven fall on opposite sides of powered pair four and six. Thus, it can be seen that a powered series of plates on one bus bar might be separated by non-powered plates attached to the other bus bar. In addition, the powered series might be bounded by non-powered plates from the other bus bar.

Likewise, it can be seen that powered pair nine and eleven from the opposite bus bar 152 is separated from powered pair four and six by non-powered plates seven and eight, which constitute one non-powered plate from each bus bar. Thus, a powered sequence of plates from one bus bar may be separated from a powered sequence of plates from the other bus bar by one or more non-powered plates, which may be from either bus bar.

Using sequences of plates with like charges serves as a turbulence inducer. It increases reactivity by establishing a turbulent zone in the process liquid. Such a placement of two plates having like fields together in sequence strongly directs similarly charged material in the process liquid away from this area. The similarly charged material aligns to react with plates of opposite charge. Several mini-cell reaction chambers can be developed in a single electrode set 110 to pulse a series of reactions as the contaminants flow through them.

Turbulence inducers create reaction zones that initiate the destabilization of ions and particles in the process liquid within seconds allowing for high flow rates through the chambers. Features added to create turbulence in the reaction chamber enhance the process of polarizing the sediment or suspension in the process liquid. If electrode surfaces are smooth, they tend to not emulsify the passing materials. Adding turbulence or breaking up the flow of water molecules and charged particulates stimulates a mixing event that brings molecules closer to the electrodes. When turbulence is added, water mixes more completely.

With reference to FIGS. 4 and 9, each electrode plate 40 serves as a host that carries an array of applied, modular, non-conductive turbulence inducers 158 on at least one major face. The turbulence inducers are of a selected thickness that is equal to or less then the inter-electrode spacing. Turbulence inducers are arranged on the host electrode to disrupt the smooth flow of process liquid across the host electrode face and in a flow path between the host electrode and a juxtaposed electrode that defines the opposite side of the flow path. In the pattern shown in FIG. 9, the flow path is from left to right, as suggested by the direction of arrows 159, shown below the electrode. The modular turbulence inducers 158 are distributed at multiple heights in the flow path, with turbulence inducers 158 of a first, left side column distributed in high, mid-height, and low positions. Turbulence inducers 158 in a second, middle column are arranged at intermediate heights, relative to the first column. Turbulence inducers of a third, right side column are arranged similarly to the first column. The resulting arrangement of turbulence inducers is symmetrical on the face of the host electrode plate, although such symmetry is not required. The symmetry and the application of turbulence inducers on only one side of the host electrode, allows the electrode plate 40 to be used in any set of electrodes, with post 138 either to the left or to the right, with similar, reliable results as to induced turbulence.

Each turbulence inducer 158 is best configured with a narrow or sharp leading edge, which is edge facing the flow direction of process liquid. Stepped edges with sharp angles are desirable. The trailing end also may form a narrow or sharp end that decreases in steps with shaft angles. The turbulence inducers 158 are formed of nonconductive materials, such as a plastic, and are attached to one side of each host electrode plate by nonconductive fasteners, such as nonconductive screws. The middle is hollow to maximize the amount of exposed surface of the host electrode.

One suitable configuration for a turbulence inducer is a stepped, mirror image chevron 158, best shown in FIGS. 4 and 9. The stepped, mirror image chevron shaped turbulence inducer has a narrow leading end structure that widens toward the midpoint or trailing end. In a turbulence inducer, widening can be in a chosen direction, such as the upper direction or the lower direction; or as shown in the drawings, the widening of a stepped, mirror image chevron is in both the upper and lower directions with increasing distance from the leading end. From the wide part, this chevron pattern narrows toward the trailing end, ending in a narrow trailing end structure. A chevron design can by symmetrical across either or both a horizontal and a vertical axis, similar to the chevrons 158 of FIGS. 4 and 9, which are symmetrical across both axes. The symmetry allows the plates to be used with either end at the front or at the rear, relative to flow direction. The illustrated chevron shaped turbulence inducers 158 have a multi-step leading edge and multi-step trailing edge, thus providing numerous sharp angles that add turbulence to the flowing liquid.

Figure 20:
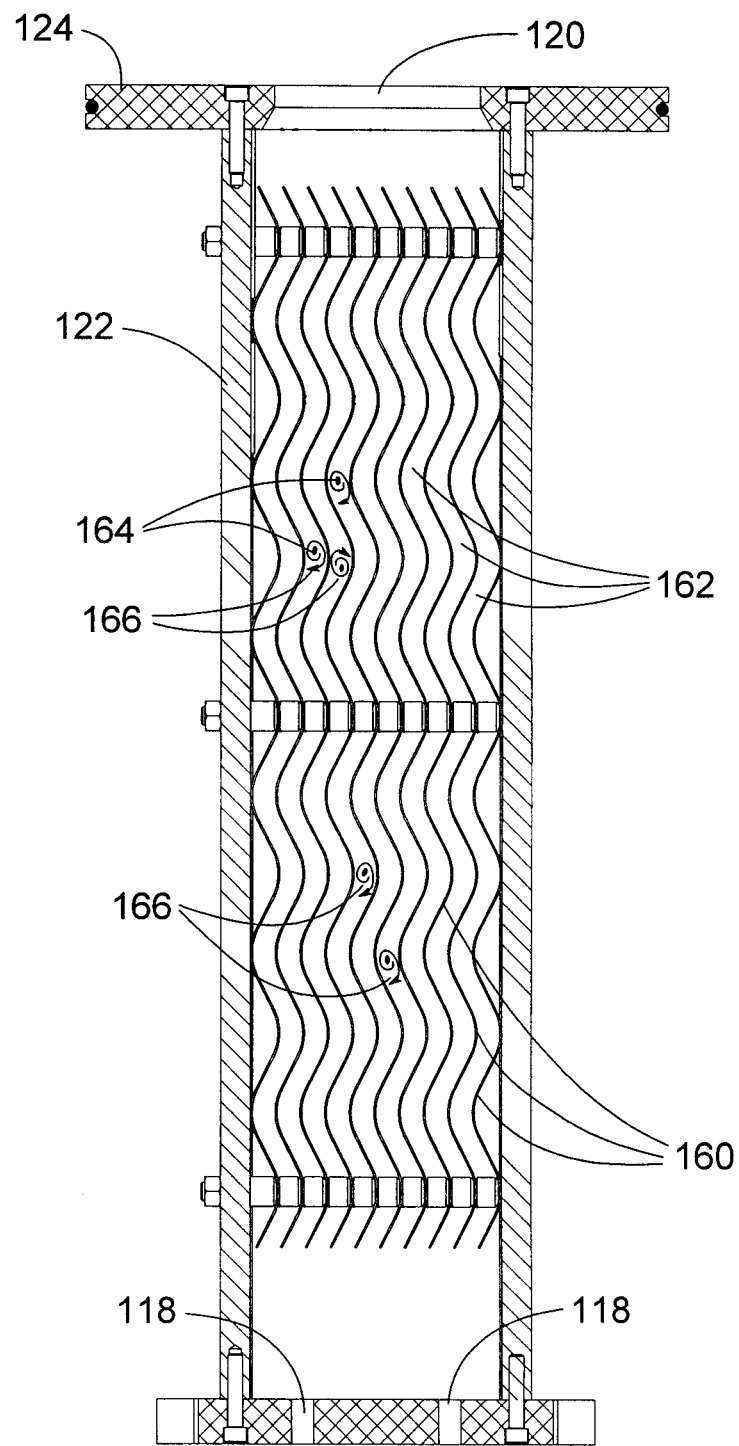
FIG. 20 is a vertical cross-section taken through a plate carrier from a modular reaction chamber, carrying sinusoidal electrode plates.

Another suitable configuration for a turbulence inducer is a sinusoidal processing path between juxtaposed plates of an electrode cell. Such a sinusoidal path can be created in several ways. As illustrated in FIG. 20, parallel electrode plates 160 can be curved in a sinusoidal manner and aligned in parallel to create a sinusoidal path 162 between them. The curvature of the plates should be a sine wave, or such plates may be configured with a period oscillation of a simple harmonic motion. A sine wave has a geometric representation of a sine wave function, $y = a\ \sin(bx)$, where "y" is the ordinate measured along a y-axis, "x" is the abscissa measured along the baseline or x-axis, "a" is the amplitude of the maximum height of the wave measured on y-axis, "2π/b" is the wave length, which is the distance from any point on the wave to the corresponding point on the next wave, measured along baseline. Many embodiments are possible and are a function of the plate material; the contaminants to be removed; the environment of the water, such as conductivity, pH, and similar variants. In one preferred embodiment, the amplitude is 0.18 inches and the wavelength is 2.24 inches.

The electrolytic process of electro precipitation causes contaminants, such as ions, molecules, and particles, to be destabilized, such that they develop into larger particles 164. An eddy effect is found in the flow path between sinusoidal electrodes 160, whereby the flow path establishes vortexes in the process liquid, suggested by vortex flow pattern lines 166. Particles 164 are retained in the vortexes 166 established by the sinusoidal pattern of the plates 160. In the view of FIG. 20, the plates are aligned in a horizontal series with flow path 162 moving generally from bottom to the top of the figure. An established vortex 166 can retain a particle 164 within the vortex for an extended time. The retention time depends on many factors, including but not limited to the size, density, and zeta charge on the particle, as well as the velocity of fluid in flow path 162 through plates 160 and the strength and nature of the charge on the plates. As a general rule, the greater the amplitude and the shorter the wavelength of a sinusoidal pattern, the greater will be the eddy effect.

The use of sinusoidal plates 160 has limitations that result in a practical problem. Electrode plates are consumable, especially the anode. A relatively thinner plate is more quickly consumed than a relatively thicker plate. Forming an electrode plate into a sinusoidal shape is easily accomplished with thin metal sheets, although these thin sheets are subject to relatively rapid consumption, leading to frequent maintenance to replace consumed plates. With increasing plate thickness, forming the plate into a sinusoidal shape is increasingly difficult or can be done by techniques that are increasingly expensive. Thus, while it would be desirable to use thicker plates to achieve reduced maintenance periods, a balance exists between the costs of forming and replacing electrode plates of sinusoidal shape.

Figure 21:
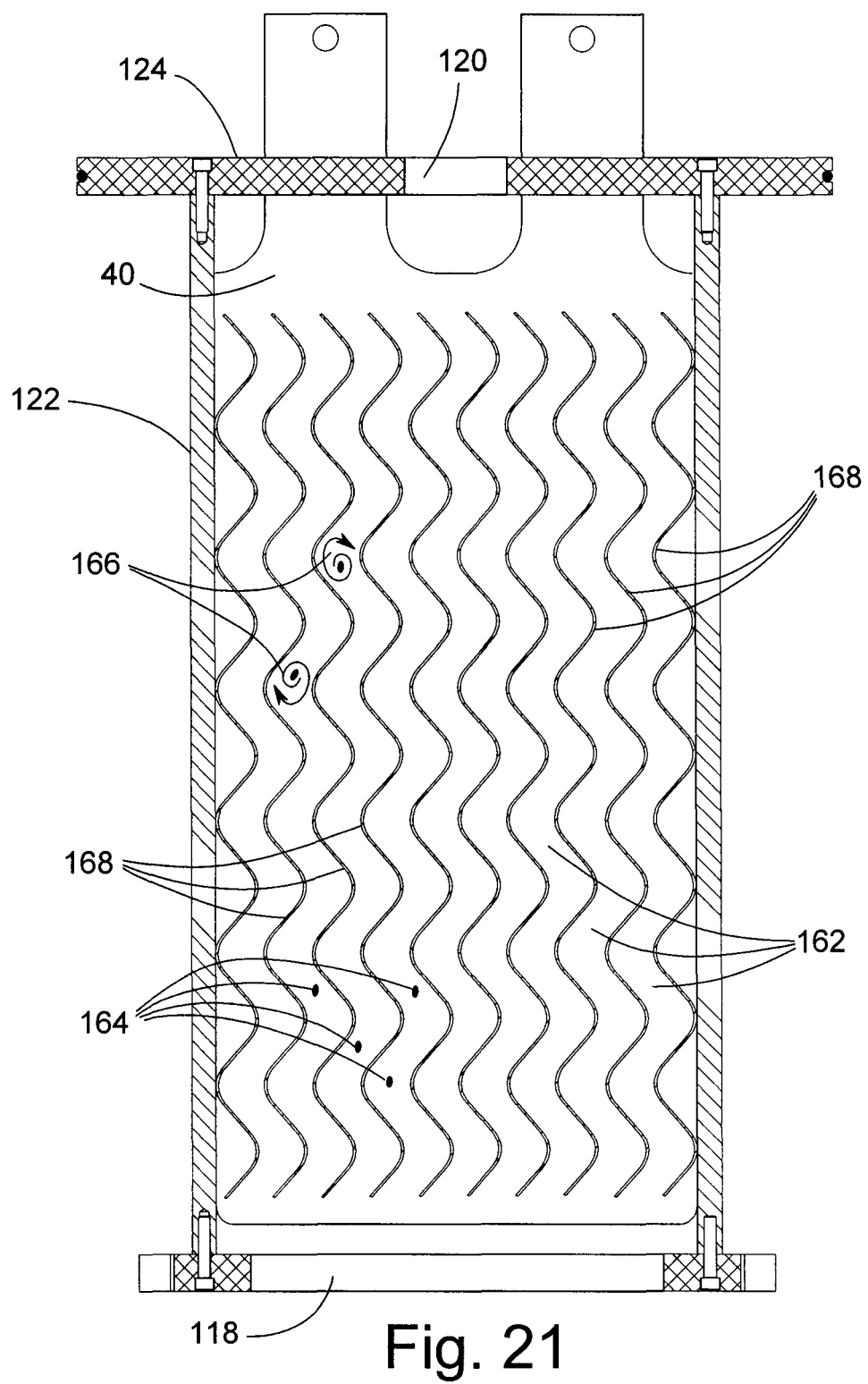
FIG. 21 is a vertical cross-section taken through a plate carrier from a modular reaction chamber, carrying a flat electrode plate with sinusoidal flow pattern defined on the plate surface by non-electrode curve-defining elements.

With reference to FIG. 21, a solution has been devised to this problem of employing heavier or longer lasting plates while maintaining a sinusoidal flow path 162. The solution is to define continuous turbulence inducers having the pattern of sinusoidal curves, with each such turbulence inducer formed of a different material than the electrode plates 160. A continuous turbulence inducer is formed of a non-conductive, non-electrode material. By employing a curve-defining element or wave guide 168 that is structured independently from the electrodes, a substantially straight, flat, or non-curved electrode plate 40 can be designed to meet other requirements, such as extended life leading to longer maintenance intervals. The curve-defining element 168 may be formed of a non-conductive, electrical insulating material such as gasket material or a suitable rubber, plastic, or other non-conductive synthetic material. The curves or waves established by curve-defining elements 168 are substantially continuous from one end of an electrode to the other, in the general direction of the flow path between the reaction chamber inlet and outlet. The curvature of the wave-defining elements should be a sine wave or have a period oscillation of a simple harmonic motion. The waves cause the process liquid to form eddies or vortexes 166 as the process liquid moves between curves and along the flat surface of plate 40.

The wave guides should be longitudinally oriented to be approximately parallel to the direction of the flow path, while being transverse to the faces of electrodes defining sides of the flow path. A desired distance between two curve-defining elements is twice the amplitude of the wave pattern so that, if the two curves were aligned with an offset equal to one-half the wavelength, the positive apex of the curve on one such element would touch the negative apex of the curve on a juxtaposed element. In simplified terms, the separation of two curves should be such that no part of the flow path allows a particle to pass from inlet to outlet without deflecting from a straight path due to encounters with the wave defining elements. As shown in FIGS. 20 and 21, in fact the wavelengths are aligned and are not offset by one-half wavelength. The waves induce turbulence in the flow of process liquid by causing the liquid to deflect from a straight path between curve surfaces. As suggested in FIG. 21, curve-defining elements should be deployed across the full width of an electrode to create wave-edged flow paths across the full width of the reaction chamber.

FIG. 21 shows an arrangement with a series of sinusoidal shaped curve-defining elements 168 applied to a flat face of a host electrode plate 40 to establish sinusoidal flow paths 162 between that electrode 40 and its neighboring electrode in an electrode set. In a related arrangement shown of FIG. 17, two host electrodes 40 can be combined sandwich-style to opposite sides of an intermediate array of curve-defining elements 168. Either construction provides convenience in installing the curve-defining elements 168 by prefabricating either a single host electrode or a pair of host electrodes with a suitable array of curve-defining elements 168. Because curve-defining elements 168 are not electrodes and, hence, are not consumable in the ordinary coarse of the electrolytic process, curve-defining elements 168 may be formed of thin sheet material, which occupies little of the flow path volume. Thus, like the hollow-centered chevrons 158, a thin-walled turbulence inducer is desirable as an addition to a flat host electrode plate because the surface area of the host plate sees little decrease. The curve-defining elements 168 may be equivalent in inter-plate thickness to spacers 126, FIG. 8, dimensioned as the initial gap between plates. Thus each curve-defining element may extend in a normal or other transverse orientation from a face of one electrode plate to the juxtaposed face of the next plate, as best shown by the filled inter-plate gap 168 in FIG. 17. An array of curve-defining elements 168 may be combined as a freestanding unit that fits between two neighboring plates. Thus, curve-defining elements 168 may be incorporated into an electrolytic cell by attachment to a face of one host electrode of a pair, by attachment to faces of a pair of host electrodes, or by interposing a freestanding array of curve-defining elements between each pair of juxtaposed electrodes in a cell.

Figure 8:
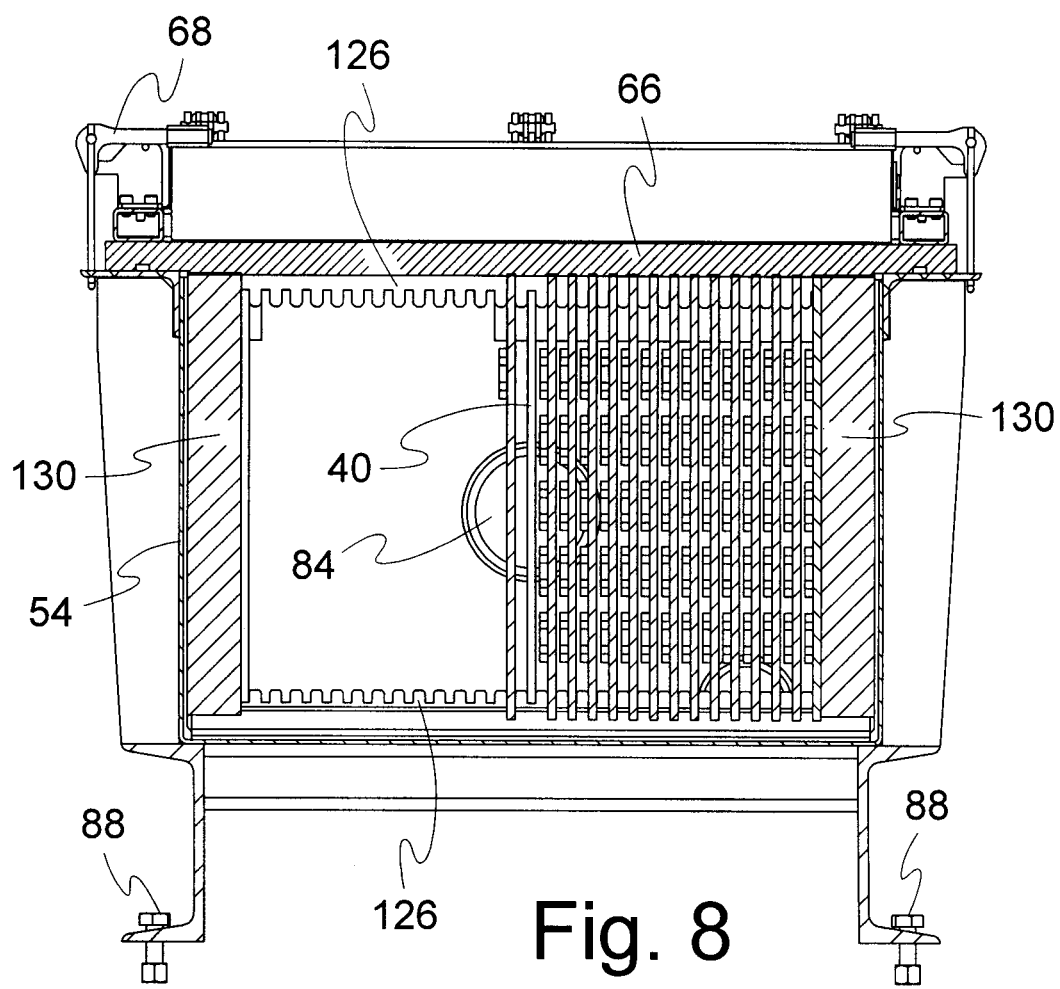
FIG. 8 is a transverse vertical cross-section taken across the reactor tank and an end set of electrodes, with electrodes at the left side of the set and some of the turbulence inducers omitted for clarity.

With reference to FIGS. 4 and 8, when the electrodes are arranged in a set 110, the inlet port 84 directs flow across the major faces of the electrodes 40. The electrodes within a set can be arranged with turbulence inducers 158 attached on a uniform side of each electrode plate, such as the left side in the view of FIG. 8. Where the thickness of the turbulence inducers 158 is less than the electrode spacing, the thinness helps to maintain flow rate over a maximum surface area of the electrode plate. Different turbulence inducers on the same electrode plate may have different thicknesses. A selected turbulence inducer 158, such as a turbulence inducer near the center of a plate, may have thickness approximately equal to the electrode spacing in order to act as a spacer that preserves the uniformity of spacing between electrodes against warping.

It is desirable for the electrodes to have a long life. One cause of short electrode life is edge erosion. Electricity tends to transmit from sharp edges, which also erodes the sharp edges. Despite the arrangement of electrodes shown in FIG. 8 with major faces of the electrodes opposing one another, current flow may concentrate at the edges of the plates. As best shown in FIG. 9, to prevent premature erosion at edges, the edges of electrodes 40 are protected by a coating 170 of nonconductive material. The coated edge 170 enhances the electrolytic process by directing electrons inside the electrode to travel in a perpendicular direction to the passing flow of water. Thus, the transfer of electrons takes place between opposed electrodes over much of the plate surface area. Coating the edges eliminates current hogging at the edges, resulting in a more efficient electrolysis process. Another means for extending electrode life is to select a material of construction that resists erosion and degradation. Electrodes 40 can be constructed of various metals. However, it has been found that the use of carbon based materials extends electrode life.

Figure 12:
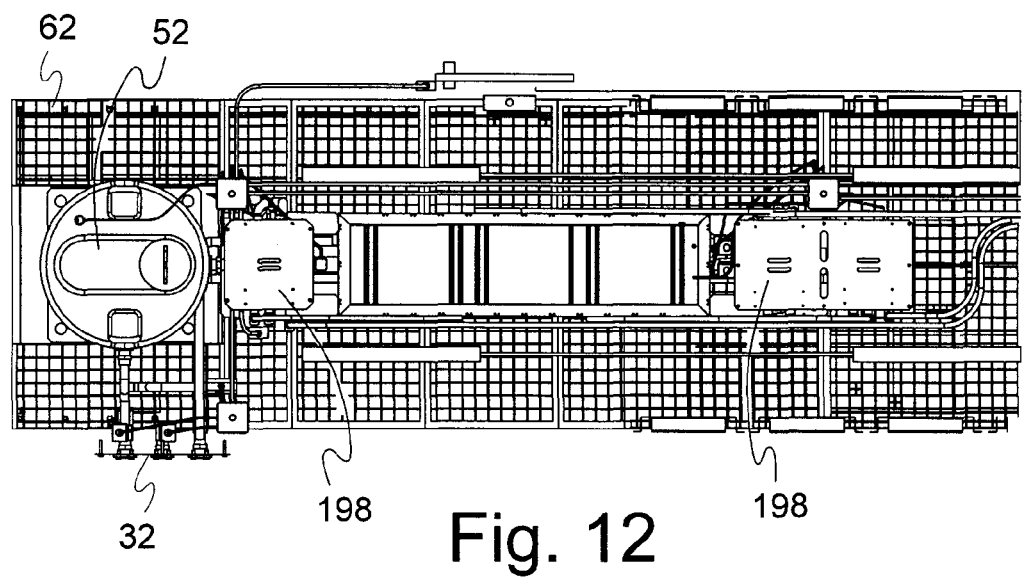
FIG. 12 is a top plan view of the process side of the electro coagulation system, showing plates for hanging single and multiple power supplies.

As mentioned in connection with FIG. 1, the reaction tank 54 may be mounted on the raised floor 62. The raised floor 62 is coated or made of nonconductive materials to minimize electrical leakage or current sharing. When using multiple power supplies, power tends to seek out paths of least resistance. With reference to FIG. 10, using nonconductive construction materials to form the base frame 60, raised floor 62, surge tank mounting area 172 and pump mounting plates 174 increases the efficiency of the overall system and prevents current sharing. With reference to FIGS. 1 and 12, elevated plates 198 are used to hang the power supplies 34, 36 from ceiling level of a room or other enclosure for the system. The general size and shape of the system is suitable for enclosure and shipment in a shipping container. Placing the power supplies 34, 36 in the air, above and laterally removed from reaction chamber 54, protects the power supplies from exposure to water. Elevating the power supplies also isolates or minimizes power leakage and protects operators from unintended contact with such sources of high DC current.

Figure 11:
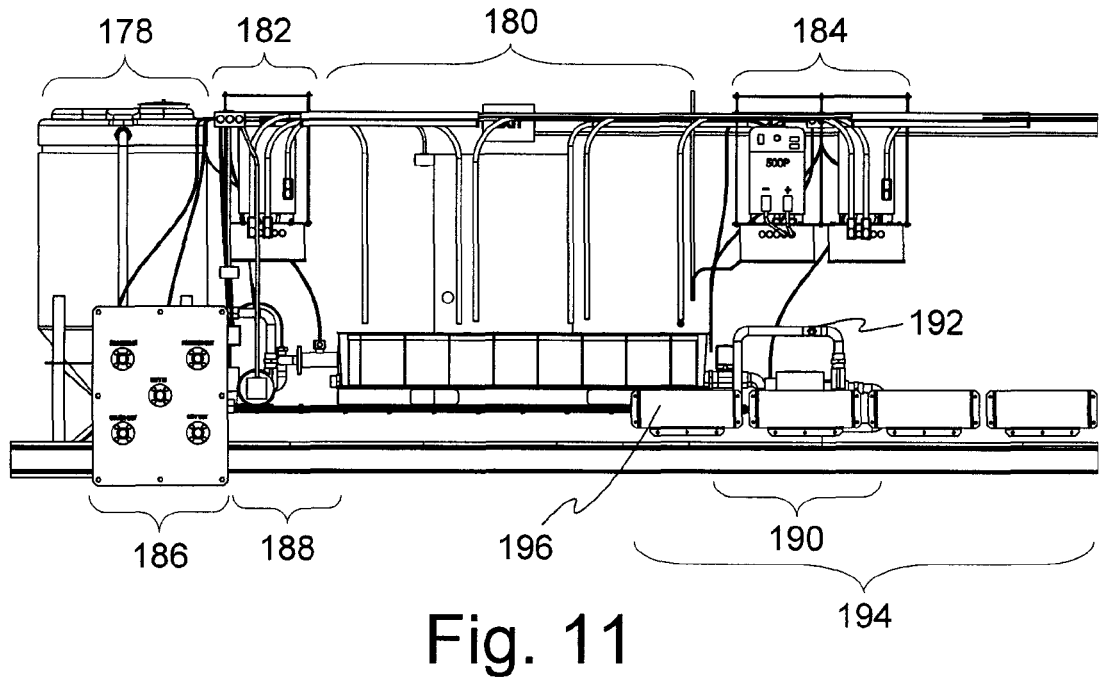
FIG. 11 is a side elevational view of a process side of the electro coagulation system, showing the system in conceptual zones.

FIG. 11 provides a view of the process side of the system segmented into zones. A surge tank zone 178 contains the surge tank 52. A reaction tank zone 180 contains the reaction tank 54. A power supply zone 182 contains the single power supply 34 while a double power supply zone 184 contains the two power supplies 36. Hookup zone 186 contains main disconnect 32. Process zone 188 contains incoming pump 56 along with valves, flow meters, and optionally a seeding pump. A sampling zone 190 contains the sampling area along with processed clean water, an out bound fluid pump 50 and a sampling manual valve 192. The sampling valve is located at waist level to take liquid samples on the back end of the system. A storage zone 194 contains storage racks 196 that are used to hold the electrodes during system maintenance when the reaction tank 54 is being flushed out to remove sediment or worn electrodes.

Figure 13:
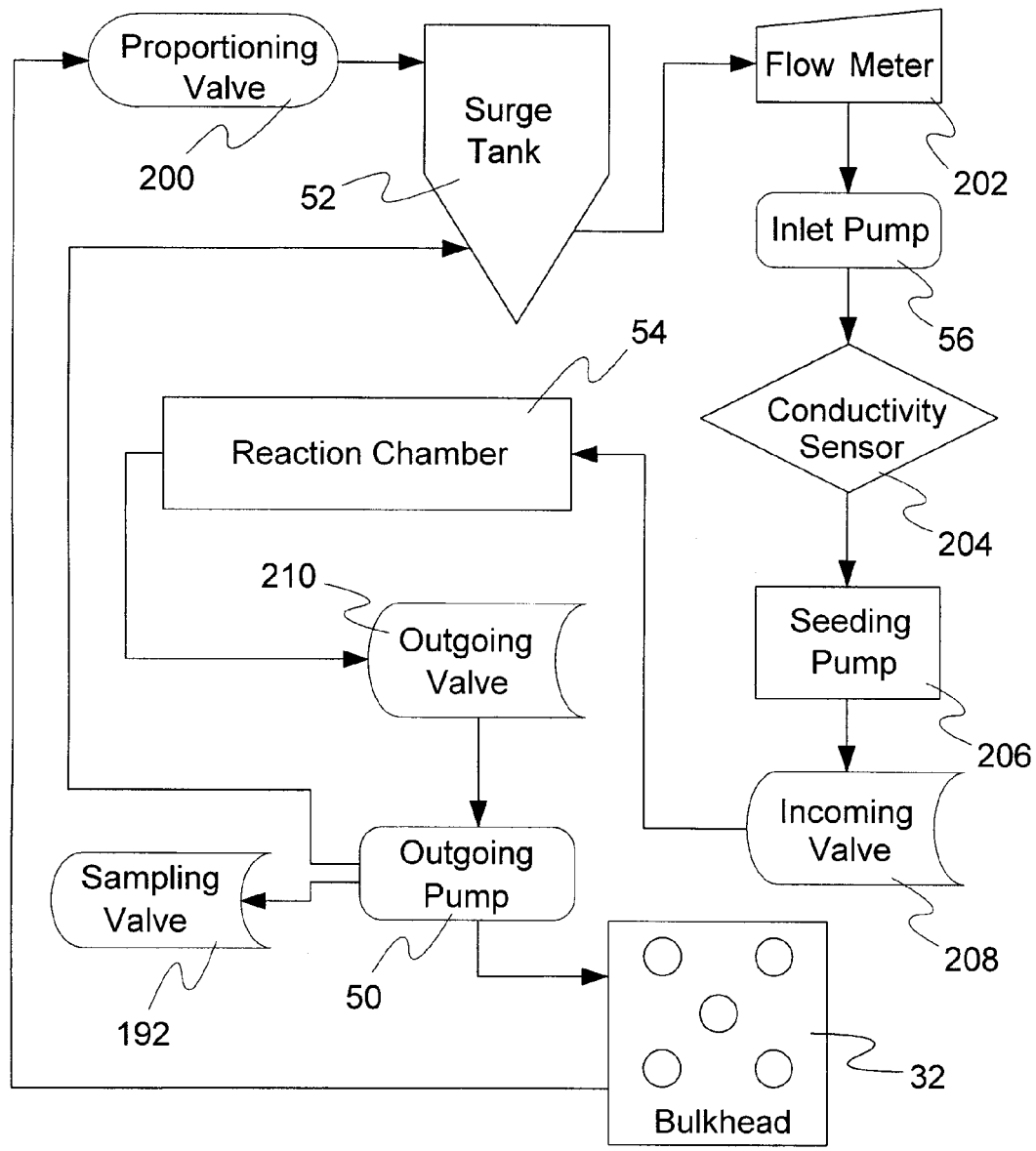
FIG. 13 is a schematic diagram showing fluid flow through the electro coagulation system.

With reference to FIG. 13, a software based control system regulates fluid flow through the electro coagulation system from the main disconnect or fluid bulkhead 32. Influent to be processed from bulkhead 32 passes through proportioning valve 200 and then into surge tank 52. The software system opens and closes the proportioning valve to keep a consistent flow of water passing into the reaction chamber 54. When the water level of the surge tank 52 reaches a predetermined high or low level limit, the proportioning valve 200 appropriately opens or closes the incoming line to maintain an optimal tank level. When water in the surge tank is maintained at a proper level, incoming sediment has time to settle, allowing heavier deposits to drop into the conical bottom of the surge tank 52. A flow meter 202 monitors flow from the surge tank and into inlet pump 56. A conductivity sensor 204 in advance of tank 54 measures whether a seeding catalyst should be added to the fluid. If so, the software system causes a seeding pump 206 to add a catalyst to the fluid stream. The software system operates incoming variable speed pump 56 and outgoing variable speed pump 50 to work together to maintain the speed of the water going thru the reaction chamber 54 and the surge tank 52. An incoming side valve 208 in advance of the tank 54 also can be adjusted to regulate flow. An outgoing side valve 210 following tank 54 provides another means for regulating flow. A manual sampling valve permits takeoff from the outgoing pump 50. From the outgoing variable speed pump 50, the processed fluid passes to the outgoing connection at the bulkhead 32, with the optional return of a portion of the processed fluid back to the surge tank for seeding the unprocessed effluent in advance of the reaction chamber 54.

The software system obtains data from the reaction chamber fluid level sensor 76, FIG. 2, to hold the water level at a height that keeps the electrodes submerged in the tank as the fluid level travels up and down. The software system employs a logic loop to track the speed of pumps 50, 56 to obtain optimal submerging of the electrodes. The liquid level in the reaction tank 54 can be maintained within an inch of the desired level. This logic loop provides optimal tank efficiency resulting in a low overall power usage.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. An electrolytic apparatus for removing contaminants from influent water, comprising:
    a reaction chamber (54, 112, 114) having a means (84, 118) for admitting water and means (84, 120) for discharging water (84, 120);
    a set (110) of spaced apart conductive electrodes (40) in said reaction chamber (54, 112, 114), arranged in first and second groups of electrodes, each group containing a plurality of electrodes, with electrodes (40) of the first group interleaved in alternating sequence with electrodes (40) of the second group, defining a flow path in a flow direction between an electrode (40) of the first group and a juxtaposed electrode of the second group, said flow path extending within said reaction chamber from said means (84, 118) for admitting water toward said means (84, 120) for discharging water;
    polarizing means (34, 36) for initially, oppositely polarizing at least some of said electrodes (40) in each of said first and second groups of said set (110); and
    turbulence inducers extending transversely to a face of an electrode (40) and into the flow path, said turbulence inducers selected from the group consisting of a plurality of modular, nonconductive elements (158) attached to a face of a host electrode (40) in a position presenting a narrow leading edge toward the direction of flow, with stepped increases in width toward a trailing edge thereof; a plurality of elongated, nonconductive, spaced apart curve-defining elements (168) positioned longitudinally to the direction of flow; and combinations thereof.

2. The electrolytic apparatus of claim 1, wherein:
    said electrodes (40) of said set (110) are mounted in said reaction chamber (54, 112, 114) at a selected inter-electrode spacing between juxtaposed electrodes of said first and second groups, said spacing establishing a flow path having a width of the selected spacing;

said modular elements (158) are of selected thickness that is less than the selected inter-electrode spacing and are mounted to a single face of a host electrode (40), providing an available flow path passing between said modular elements (158) and said juxtaposed electrode (40).

3. The electrolytic apparatus of claim 2, wherein:
at least one of said modular elements (158) defines a hollow center area exposing the face of said host electrode (40).

4. The electrolytic apparatus of claim 1, wherein:
said electrodes (40) of said set (110) are mounted in said reaction chamber (54, 112, 114) at a selected inter-electrode spacing between juxtaposed electrodes of said first and second groups, said spacing establishing a flow path having a width of the selected spacing;
at least one of said modular elements (158) is of selected thickness that is equal to the selected inter-electrode spacing and is mounted to a single face of a host electrode (40), providing an electrode spacer between said host electrode (40) and said juxtaposed electrode (40).

5. The electrolytic apparatus of claim 1, wherein:
at least one of said modular elements (158) is symmetrical with respect to said flow direction.

6. The electrolytic apparatus of claim 1, wherein:
at least one of said modular elements (158) is symmetrical transversely to said flow direction.

7. The electrolytic apparatus of claim 1, wherein:
said curve-defining elements (168) are mounted to a major face of a host electrode (40) and extend transversely thereto; and
said major face is flat.

8. The electrolytic apparatus of claim 1, wherein:
said curve-defining elements (168) are curved in a sine wave.

9. The electrolytic apparatus of claim 1, wherein:
said curve-defining elements (168) are curved with period oscillation of a simple harmonic motion.

10. The electrolytic apparatus of claim 1, wherein:
said curve-defining elements (168) are mounted to a major face of a host electrode (40) and extend transversely thereto; and
said curve-defining elements (168) are formed of sheet material.

11. The electrolytic apparatus of claim 1, wherein:
said set (110) of said electrodes (40) carries said curve-defining elements (168) between a juxtaposed pair of the electrodes (40);
said juxtaposed pair of electrodes (40) is mounted in said reaction chamber (54, 112, 114) with a selected inter-electrode spacing;
the curve-defining elements extend transversely between the juxtaposed pair of electrodes with a width of said selected inter-electrode spacing, transversely bounding said flow path between the juxtaposed electrodes (40).

12. The electrolytic apparatus of claim 1, wherein:
said first and second groups of electrodes (40) are interleaved such that an electrode (40) of the first group is the first electrode (150) of the set (110), and an electrode (40) of the second group is the last electrode (150) of the set (110);
said polarizing means (34, 36) is connected to apply a first polarity to said first electrode (150) and to apply a second and opposite polarity to said last electrode (150); and
the polarizing means (34, 36) is electrically disconnected from remaining electrodes (151) of the first and second groups.

13. The electrolytic apparatus of claim 1, wherein:
said first group of electrodes (40) is connected to a first bus bar;
the first bus bar defines a conductive end portion (146) having a junction with said polarizing means (34, 36) and with said first electrode (150), and further defines a nonconductive body portion (148) having junctions with said remaining electrodes (151) of first group.

14. The electrolytic apparatus of claim 1, wherein:
said first group of electrodes (40) is joined to a first bus bar (152);
the first bus bar (152) defines a plurality of conductive junction areas interspaced with non-conductive junction areas (154), wherein said conductive junction areas are electrically joined to a first subset of selected electrodes of the first group, and said non-conductive junction areas (154) of said first bus bar (152) are joined to a second subset of selected electrodes (40) of said first group;
said second group of electrodes (40) is connected to a second bus bar (156);
the second bus bar (156) defines a plurality of conductive junction areas interspaced with non-conductive junction areas (154), wherein said conductive junction areas are electrically joined to a first subset of selected electrodes of the second group, and said non-conductive junction areas (154) of said second bus bar (156) are joined to a second subset of selected electrodes (40) of said second group; and
said polarizing means (34, 36) is connected to the conductive junction areas of the first bus bar (152) to apply a first polarity to said first subset of selected electrodes of the first group and is connected to the conductive junction areas of the second bus bar (156) to apply a second and opposite polarity to said first subset of selected electrodes of the second group.

15. The electrolytic apparatus of claim 1, wherein said polarizing means further comprises:
selectively actuatable means (38) for reversing polarity of said initially polarized electrodes (40) in each of said first and second groups of said set (110); and
means (42) responsive to selective actuation of means for reversing polarity, for capacitively discharging the initial polarization of the initially polarized electrodes (40).

16. An electrolytic apparatus for removing contaminants from influent water, comprising:
a reaction chamber (54, 112, 114) having a means (84, 118) for admitting water and means (84, 120) for discharging water (84, 120);
a set (110) of spaced apart conductive electrodes (40) in said reaction chamber (54, 112, 114), arranged in first and second groups of electrodes, each group containing a plurality of electrodes, with electrodes (40) of the first group interleaved in alternating sequence with electrodes (40) of the second group, defining a flow path in a flow direction between an electrode (40) of the first group and a juxtaposed electrode of the second group, said flow path extending within said reaction chamber from said means (84, 118) for admitting water toward said means (84, 120) for discharging water;
polarizing means (34, 36) for initially, oppositely polarizing at least some of said electrodes (40) in each of said first and second groups of said set (110); and wherein
said first and second groups of electrodes (40) are interleaved such that an electrode (40) of the first group is the first electrode (150) of the set (110), and an electrode (40) of the second group is the last electrode (150) of the set (110);

said polarizing means (34, 36) is connected to apply a first polarity to said first electrode (150) and to apply a second and opposite polarity to said last electrode (150); and the polarizing means (34, 36) is electrically disconnected from remaining electrodes (151) of the first and second groups;

and wherein said polarizing means further comprises:

selectively actuatable means (38) for reversing polarity of said initially polarized electrodes (40) in each of said first and second groups of said set (110); and means (42) responsive to selective actuation of means for reversing polarity, for capacitively discharging the initial polarization of the initially polarized electrodes (40).

17. An electrolytic apparatus for removing contaminants from influent water, comprising:

a reaction chamber (54, 112, 114) having a means (84, 118) for admitting water and means (84, 120) for discharging water (84, 120);

a set (110) of spaced apart conductive electrodes (40) in said reaction chamber (54, 112, 114), arranged in first and second groups of electrodes, each group containing a plurality of electrodes, with electrodes (40) of the first group interleaved in alternating sequence with electrodes (40) of the second group, defining a flow path in a flow direction between an electrode (40) of the first group and a juxtaposed electrode of the second group, said flow path extending within said reaction chamber from said means (84, 118) for admitting water toward said means (84, 120) for discharging water;

polarizing means (34, 36) for initially, oppositely polarizing at least some of said electrodes (40) in each of said first and second groups of said set (110);

wherein said polarizing means further comprises:

selectively actuatable means (38) for reversing polarity of said initially polarized electrodes (40) in each of said first and second groups of said set (110); and means (42) responsive to selective actuation of means for reversing polarity, for capacitively discharging the initial polarization of the initially polarized electrodes (40).

18. The electrolytic apparatus of claim 17, further comprising:

a turbulence inducer (158) extending transversely to a face of an electrode (40) and into the flow path;

wherein:

said electrodes (40) of said set (110) are mounted in said reaction chamber (54, 112, 114) at a selected inter-electrode spacing between juxtaposed electrodes of said first and second groups, said spacing establishing a flow path having a width of the selected spacing; and said turbulence inducer (158) is of selected thickness that is less than the selected inter-electrode spacing and is mounted to a single face of a host electrode (40), providing an available flow path passing between said turbulence inducer (158) and said juxtaposed electrode (40).

19. The electrolytic apparatus of claim 18, wherein:

said turbulence inducer (158) defines a hollow center area exposing the face of said host electrode (40).

20. The electrolytic apparatus of claim 18, wherein:

said turbulence inducer (158) is symmetrical with respect to said flow direction.

21. The electrolytic apparatus of claim 18, wherein:

said turbulence inducer (158) is symmetrical transversely to said flow direction.

22. The electrolytic apparatus of claim 17, further comprising:

a turbulence inducer (158) extending transversely to a face of an electrode (40) and into the flow path;

wherein:

said electrodes (40) of said set (110) are mounted in said reaction chamber (54, 112, 114) at a selected inter-electrode spacing between juxtaposed electrodes of said first and second groups, said spacing establishing a flow path having a width of the selected spacing; and said turbulence inducer (158) is of selected thickness that is equal to the selected inter-electrode spacing and is mounted to a single face of a host electrode (40), providing an electrode spacer between said host electrode (40) and said juxtaposed electrode (40).

23. The electrolytic apparatus of claim 17, further comprising:

at least one elongated, nonconductive, curve-defining element (168) positioned longitudinally to the direction of flow;

wherein:

said curve-defining element (168) is mounted to major face of a host electrode (40) and extends transversely thereto; and said major face is flat.

24. The electrolytic apparatus of claim 17, further comprising:

at least one elongated, nonconductive, curve-defining element (168) positioned longitudinally to the direction of flow;

wherein:

said curve-defining element (168) is curved in a sine wave.

25. The electrolytic apparatus of claim 17, further comprising:

at least one elongated, nonconductive, curve-defining element (168) positioned longitudinally to the direction of flow;

wherein:

said curve-defining element (168) is curved with period oscillation of a simple harmonic motion.

26. The electrolytic apparatus of claim 17, further comprising:

at least one elongated, nonconductive, curve-defining element (168) positioned longitudinally to the direction of flow;

wherein:

said curve-defining element (168) is mounted to a major face of a host electrode (40) and extends transversely thereto; and said curve-defining element (168) is formed of sheet material.

27. The electrolytic apparatus of claim 17, further comprising:

a plurality of elongated, nonconductive, curve-defining elements (168) positioned longitudinally to the direction of flow;

wherein:

said set (110) of said electrodes (40) carries said curve-defining elements (168) between a juxtaposed pair of the electrodes (40);

said juxtaposed pair of electrodes (40) is mounted in said reaction chamber (54, 112, 114) with a selected inter-electrode spacing; and the curve-defining elements extend transversely between the juxtaposed pair of electrodes with a width of said selected inter-electrode spacing, transversely bounding said flow path between the juxtaposed electrodes (40).

28. The electrolytic apparatus of claim 17, wherein:

said first and second groups of electrodes (40) are interleaved such that an electrode (40) of the first group is the first electrode (150) of the set (110), and an electrode (40) of the second group is the last electrode (150) of the set (110);

said polarizing means (34, 36) is connected to apply a first polarity to said first electrode (150) and to apply a second and opposite polarity to said last electrode (150); and the polarizing means (34, 36) is electrically disconnected from remaining electrodes (151) of the first and second groups.

29. The electrolytic apparatus of claim 17, wherein:

said first group of electrodes (40) is connected to a first bus bar;

the first bus bar defines a conductive end portion (146) having a junction with said polarizing means (34, 36) and with said first electrode (150), and further defines a nonconductive body portion (148) having junctions with said remaining electrodes (151) of first group.

30. The electrolytic apparatus of claim 17, wherein:

said first group of electrodes (40) is joined to a first bus bar (152);

the first bus bar (152) defines a plurality of conductive junction areas interspaced with non-conductive junction areas (154), wherein said conductive junction areas are electrically joined to a first subset of selected electrodes of the first group, and said non-conductive junction areas (154) of said first bus bar (152) are joined to a second subset of selected electrodes (40) of said first group;

said second group of electrodes (40) is connected to a second bus bar (156);

the second bus bar (156) defines a plurality of conductive junction areas interspaced with non-conductive junction areas (154), wherein said conductive junction areas are electrically joined to a first subset of selected electrodes of the second group, and said non-conductive junction areas (154) of said second bus bar (156) are joined to a second subset of selected electrodes (40) of said second group; and said polarizing means (34, 36) is connected to the conductive junction areas of the first bus bar (152) to apply a first polarity to said first subset of selected electrodes of the first group and is connected to the conductive junction areas of the second bus bar (156) to apply a second and opposite polarity to said first subset of selected electrodes of the second group.

* * * * *